United States Patent
Wilde et al.

(10) Patent No.: US 6,181,673 B1
(45) Date of Patent: Jan. 30, 2001

(54) SLIDER DESIGN

(75) Inventors: Jeffrey P. Wilde, Los Gatos; Joseph E. Davis, Morgan Hill; Jimmy J. Shen, Fremont; Marcus H. Barnes, Felton, all of CA (US)

(73) Assignee: Read-Rite Corporation, Fremont, CA (US)

( * ) Notice: Under 35 U.S.C. 154(b), the term of this patent shall be extended for 0 days.

(21) Appl. No.: 09/344,159

(22) Filed: Jun. 24, 1999

Related U.S. Application Data

(63) Continuation-in-part of application No. 09/022,172, filed on Feb. 11, 1998, now abandoned, and a continuation-in-part of application No. 08/731,214, filed on Oct. 10, 1996, now Pat. No. 6,044,056, which is a continuation-in-part of application No. 60/022,775, filed on Jul. 30, 1996, which is a continuation-in-part of application No. 60/023,476, filed on Aug. 6, 1996, which is a continuation-in-part of application No. 60/025,801, filed on Aug. 27, 1996, which is a continuation-in-part of application No. 09/191,835, filed on Nov. 13, 1998.

(51) Int. Cl.$^7$ ............................ G11B 21/21; G11B 17/32; G11B 5/60; G11B 7/12
(52) U.S. Cl. ............................................. 369/300; 360/234.3
(58) Field of Search ................. 360/114, 234.3, 360/234.4; 369/13, 300

(56) References Cited

U.S. PATENT DOCUMENTS

| | | | |
|---|---|---|---|
| 4,581,529 | * | 4/1986 | Gordon .......................... 250/227.26 |
| 4,626,679 | * | 12/1986 | Kuwayama et al. ............. 250/227.11 |
| 4,633,450 | * | 12/1986 | Gueugnon ............................ 369/13 |
| 4,836,638 | * | 6/1989 | Finzel .................................... 385/59 |
| 4,860,276 | * | 8/1989 | Ukita et al. ......................... 369/119 |
| 4,911,512 | * | 3/1990 | Yamamoto et al. .................... 385/14 |
| 4,945,400 | * | 7/1990 | Blonder et al. ...................... 257/116 |
| 4,987,505 | * | 1/1991 | Iwabuchi et al. .................... 360/103 |
| 5,065,390 | * | 11/1991 | Miyauchi et al. ................... 369/110 |
| 5,124,961 | * | 6/1992 | Yamaguchi et al. ................... 369/13 |
| 5,140,569 | * | 8/1992 | Nebashi ................................. 369/13 |
| 5,150,338 | * | 9/1992 | Birecki et al. ......................... 369/13 |
| 5,199,090 | * | 3/1993 | Bell ....................................... 385/33 |
| 5,255,260 | * | 10/1993 | Yamada et al. ...................... 369/199 |
| 5,383,034 | * | 1/1995 | Imamura et al. ..................... 358/474 |
| 5,432,763 | * | 7/1995 | Campbell et al. ................. 369/44.19 |
| 5,481,386 | * | 1/1996 | Shimano et al. .................. 369/44.12 |
| 5,497,359 | * | 3/1996 | Mamin et al. ..................... 369/44.15 |
| 5,737,302 | * | 4/1998 | Kasahara ............................. 369/118 |
| 5,850,375 | * | 12/1998 | Wilde et al. ........................... 369/14 |
| 5,881,042 | * | 3/1999 | Knight .................................. 369/99 |
| 6,034,938 | * | 3/2000 | Heanue et al. ...................... 369/112 |

FOREIGN PATENT DOCUMENTS

| | | | |
|---|---|---|---|
| 60-59548 | * | 4/1985 | (JP) . |
| 61-255529 | * | 11/1986 | (JP) . |
| 62-020122 | * | 1/1987 | (JP) . |
| 1-307934 | * | 12/1989 | (JP) . |
| 3-091173 | * | 4/1991 | (JP) . |
| 5-054422 | * | 3/1993 | (JP) . |
| 5-274836 | * | 10/1993 | (JP) . |
| 11-65021 | * | 12/1999 | (JP) . |

* cited by examiner

*Primary Examiner*—William Klimowicz
(74) *Attorney, Agent, or Firm*—Samuel A. Kassatly

(57) ABSTRACT

A slider is used in an optical or magneto-optical head having an optical assembly mounted on the slider body, for directing a read-write laser beam onto and from a data storage disk. The optical assembly includes an optical fiber a mirror a quarter wavelength plate, and a lens. The optical fiber guides the laser beam along an optical path defined by the optical assembly and the slider body. The laser beam emanating from the optical fiber impinges upon the mirror and is reflected thereby onto and through the quarter wavelength plate. The laser beam continues its travel along the optical path through the lens and a magnetic coil assembly onto the disk. The slider includes a channel pattern formed on its upper surface for positioning the optical components on the slider body. The channel pattern includes a plurality of channels that define an optical path, and a plurality of cavities formed along these channels for receiving various components such as optical, magnetic and electrical components.

22 Claims, 16 Drawing Sheets

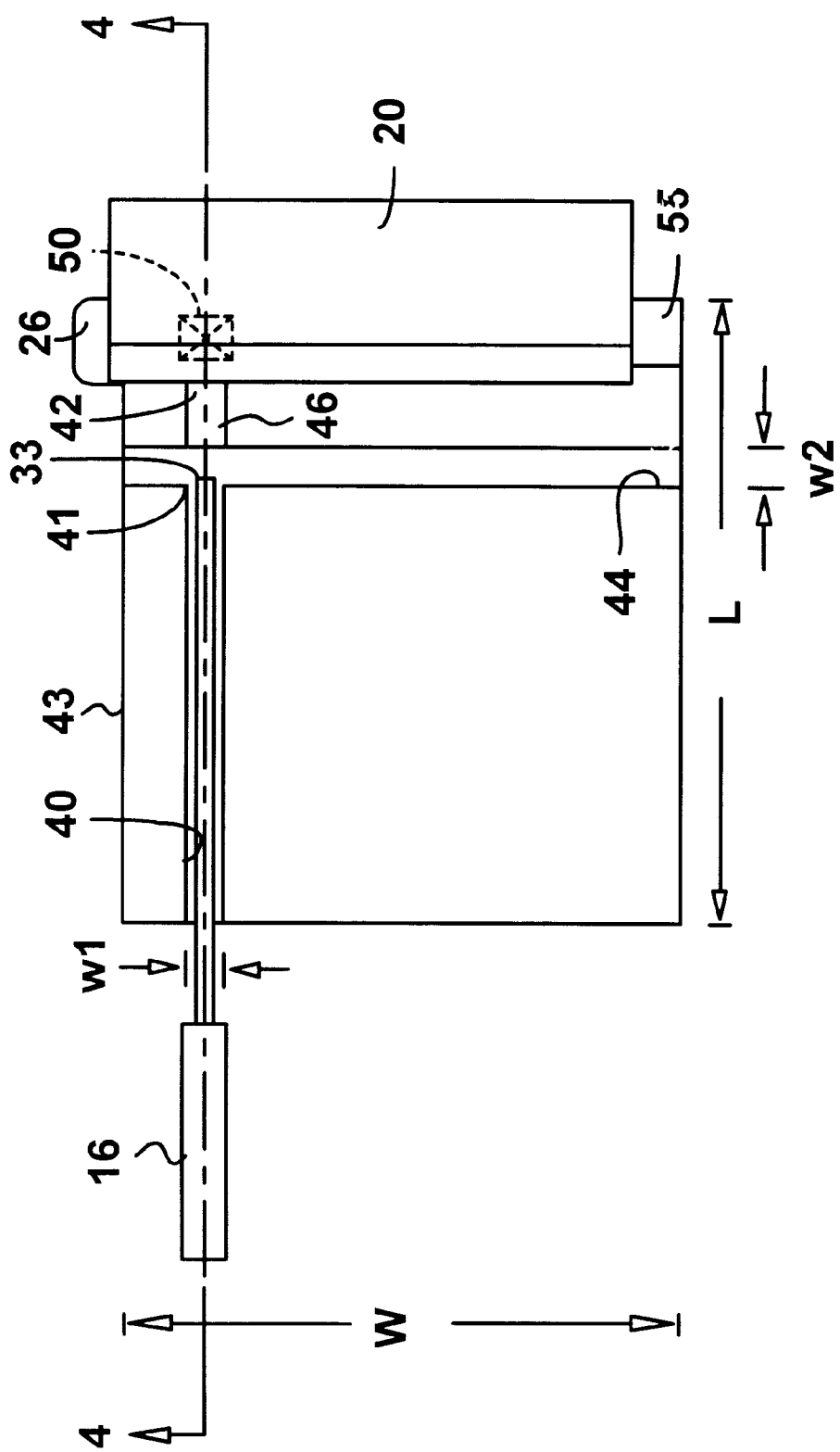

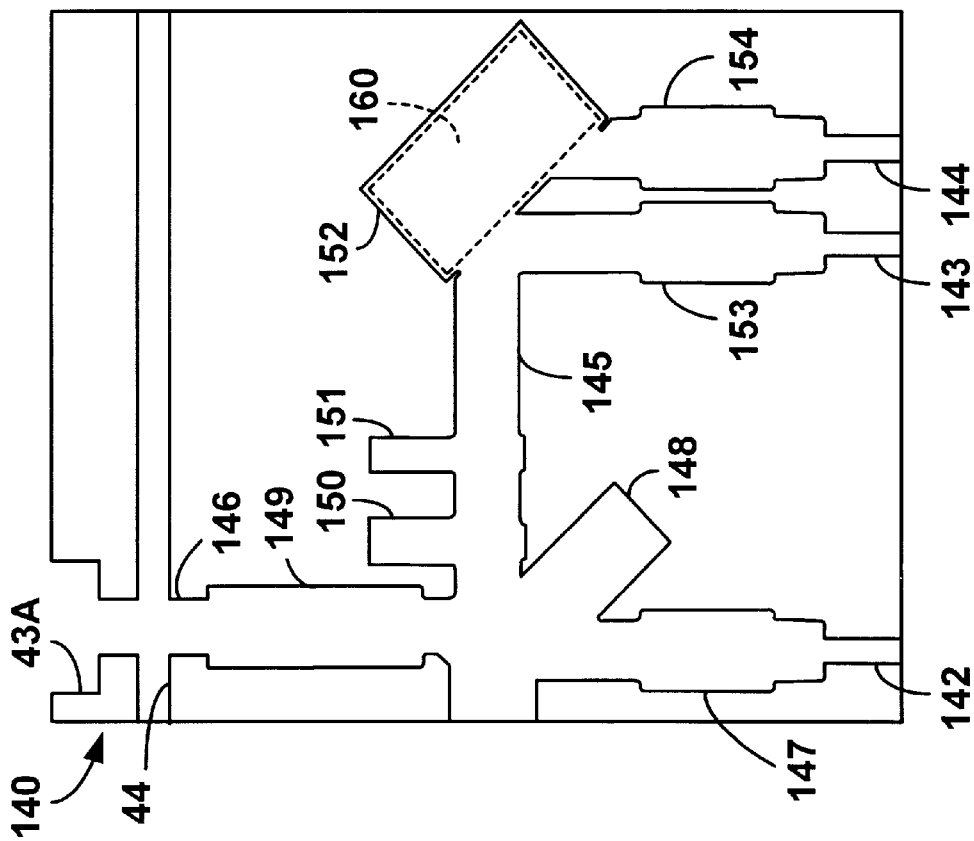
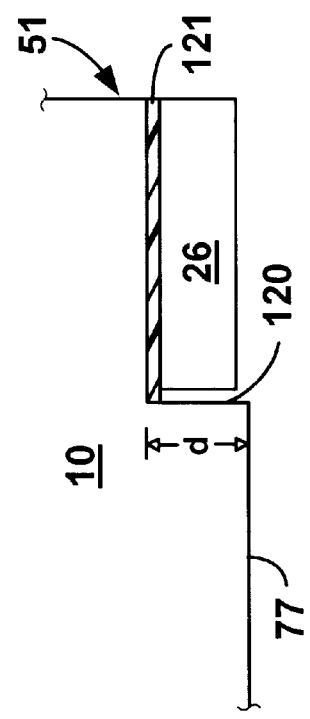
FIG. 9
FIG. 10

SLIDER DESIGN

CROSS-REFERENCE TO RELATED APPLICATIONS

This application is a continuation-in-part application of the following U.S. patent applications, all of which are incorporated herein by reference:

Ser. No. 09/022,172, filed on Feb. 11, 1998, and titled "Slider Design" now abandoned;

Ser. No. 08/731,214, filed on Oct. 10, 1996, and titled "Flying Optical Head with Dynamic Mirror", now U.S. Pat. No. 6,044,056, which claims the priority of the following provisional applications, all of which are incorporated herein by reference:

Provisional application Serial No. 60/022,775, filed on Jul. 30, 1996, and titled "A Data Storage And Retrieval System Based on Flying Magneto-Optical Read";

Provisional application Serial No. 60/023,476, filed on Aug. 6, 1996, and titled "A Data Storage And Retrieval System Based on A Flying Magneto-Optical Head";

Provisional application Serial No. 60/025,801, filed on Aug. 27, 1996, and titled "A Data Storage And Retrieval System Based on A Flying Magneto-Optical Head": U.S. appl. Ser. No. 09/191,835, filed on Nov. 13, 1998, and titled "Magneto-Optical Data Storage System Having an Optical Processing Flying Head".

The present patent application relates to the following patent applications all of which are incorporated herein by reference:

Ser. No. 08/844,003, filed on Apr. 18,1997, now abandoned, and titled "Magnetic Coil Assembly";

Ser. No. 08/844,167, filed on Apr. 18, 1997, and titled "Coil for Use With Magneto-Optical Head", which issued as U.S. Pat. No. 5,903,525 on May 11, 1999; and Ser. No. 08/938,765, filed on Sep. 26, 1997, now abandoned and titled "Slider Design for a Magneto-optical Read-write Head".

BACKGROUND OF THE INVENTION

1. Field of the Invention

The present invention relates to the field of data storage systems such as disk drives. The invention particularly relates to a slider design for use in an optical or magneto-optical read-write head for high density recording and reading of information onto and from a storage medium.

2. Description of the Related Art

Data storage systems such as those used with computer systems, typically store data magnetically or magneto-optically onto a storage medium. The data stored on the medium, whether magnetic or optical, is contained in spiral or concentric tracks. An optical data storage system described in U.S. Pat. No. 4,799,210 to Wilson, includes a laser diode assembly mounted on a fixed platform, and an optical head mounted on a movable stage. The laser beam is coupled to the movable head through a flexible optical fiber. Japanese patent application No. 59-117,180 describes another optical system mounted on the top or upper side of a slider.

Efforts to reduce the size and weight of optical heads are represented by optical integrated circuits or thin film structures. U.S. Pat. No. 4,911,512 to Yamamoto et al. describes a far-field type optical transducer, and a semi-conductor laser secured on a submount of silicon. A thin film silicon dioxide, $SiO_2$, waveguide element and a glass waveguide layer are also fixed on the submount. A collimator lens, a beam splitter, and a focusing grating are formed on the glass waveguide layer.

Another attempt to achieve compactness and weight reduction of a magneto-optical head is described in U.S. Pat. No. 5,199,090 to Bell. The Bell patent describes a magneto-optic head fabricated on a glass slider and flown adjacent a magneto-optical disk. A transducer is fabricated on an end of the glass slider. A planar or channel waveguide structure, fabricated by ion exchange in the end face of the glass slider, couples light from a light source, such as a laser diode, to the disk for reading or writing.

Conventional magnetic read-write heads commonly utilize sliders as carriers for the magnetic assembly. These sliders are typically designed in compliance with the International Disk Drive Equipment and Material Association (IDEA) specifications. The following Table I illustrates conventional slider design characteristics that are not applicable yet to optical or magneto-optical sliders.

TABLE I

| | SLIDER DESIGN - IDEA SPECIFICATIONS | | | |
|---|---|---|---|---|
| | Mini Slider | Micro Slider | Nano Slider | Pico Slider |
| Length | 0.160 inch (4064 μm) | 0.112 inch (2845 μm) | 0.080 inch (2032 μm) | 0.049 inch (1245 μm) |
| Width | 0.125 inch (3175 μm) | 0.088 inch (2235 μm) | 0.063 inch (1600 μm) | 0.039 inch (991 μm) |
| Height | 0.035 inch (889 μm) | 0.024 inch (610 μm) | 0.017 inch (432 μm) | 0.012 inch (305 μm) |

Optical heads present several slider design concerns. A first concern relates to the optical path of the optical assembly mounted on the slider. The optical path limits the ability to reduce the slider height, particularly if such a height forms part of the optical path. Another concern relates to the footprint (i.e., the projected surface area) of the slider, which should be sufficiently large to carry the optical assembly and the fibers mounted onto the slider, without affecting the aerodynamic flying performance of the optical head. Yet another consideration is the weight of the slider in light of the additional weight of the optical assembly and fibers.

Another design concern is the overall weight of the optical head. It is a desirable objective to reduce the slider weight in order to improve the data access time. However, the slider design in an optical or magneto-optical read-write head is more involved than the slider design of a magnetic head, since additional features are needed to accommodate the slider optical components such as a lens, a mirror, optical fibers, and a field generating magnetic coil in the case to a magneto-optical recording head. These additional components augment the fabrication complexity of the slider design, and further increase the access time.

For example, the pico slider might not be an effective aerodynamic platform because it is too small and light, causing the optical fiber stiffness to dominate the slider air bearing stiffness. The pico, nano and micro sliders might not be effective optical platforms because they are too thin, and probably would not meet the optical requirements of the head. The mini slider would satisfy the optical requirements of the head; however, the mini slider is too bulky and heavy, particularly with the added mass of the optical assembly.

The continuing trend toward miniaturization of data storage systems is faced with the foregoing and other concerns, and cannot be accomplished by an arbitrary reduction in size and weight of the sliders.

SUMMARY OF THE INVENTION

According to the present invention, improvement is achieved in compactness and weight reduction of the slider design. The slider allows optical drives to achieve access time comparable to that of a magnetic head disk drive. Furthermore, the slider enables a more reliable head to disk interface system with an optical or magneto-optical plastic disk, and effects a lower gram load on the load beam and the slider. The slider of the present invention is reliable, and is compliant with the uneven topography of a rotating disk. The new slider design allows a relatively tight disk to disk spacing because of its z- height.

The foregoing and other features of the present invention are realized by a new slider that directs a read-write laser beam onto and from a data storage disk. An optical assembly is mounted on the slider body, and includes an optical fiber, a mirror, a quarter wavelength plate, and a lens. The optical fiber guides the laser beam along an optical path defined by the optical assembly and the slider body. The laser beam emanating from the optical fiber impinges upon the mirror and is reflected thereby onto and through the quarter wavelength plate. The laser beam continues its travel along the optical path through the lens and a magnetic coil assembly onto the disk.

The slider body is dimensioned to accommodate the physical size and weight of the optical assembly, as well as the working distance between a lens and the disk, along the optical path. The slider body is dimensioned to accommodate the dimensional constraints of the optical assembly. The slider has the approximate height of a mini slider, i.e., approximately 889 μm, and the planar footprint area corresponding to that of a nano slider, i.e., a length of approximately 2032 μm and a width of approximately 1600 μm. Several channels are formed in the slider to define an unobstructed optical path.

BRIEF DESCRIPTION OF THE DRAWINGS

The features of the present invention and the manner of attaining them, will become apparent, and the invention will be understood by reference to the following description and the accompanying drawings, wherein:

FIG. 2 is a top plan view of the slider of FIG. 1 shown assembled to an optical assembly;

FIG. 4 is a cross-sectional, side elevational view of the slider and optical assembly of FIGS. 2 and 3, taken along line 4—4 in FIG. 2;

FIG. 9 is a top plan view of another slider design showing an alternative channel configuration;

FIG. 10 is an enlarged, fragmentary, side elevational view of one of the sliders of the present invention, illustrating a stepped groove that accommodates the coil assembly;

Similar numerals refer to similar elements in the drawings. It should be understood that the sizes and dimensions of the various components in the figures might not be in exact proportion, and are shown for visual clarity and for the purpose of explanation.

DETAILED DESCRIPTION OF THE PREFERRED EMBODIMENTS

Figure 1:
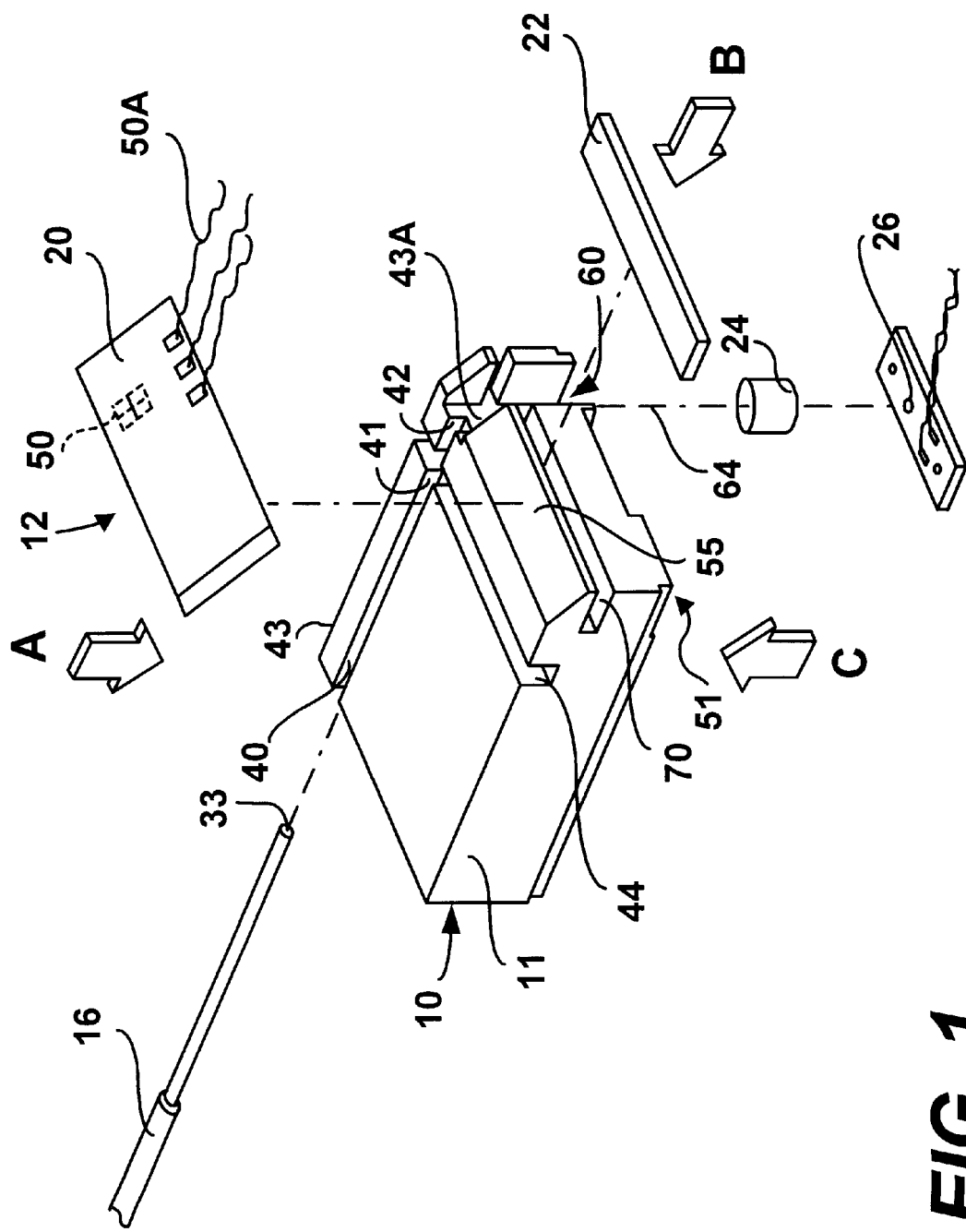
FIG. 1 is an exploded, perspective view of a slider design according to the present invention.

FIGS. 1 through 5 illustrate a slider 10 and an optical assembly 12 for use in an optical or magneto-optical head according to the present invention. With further reference to FIG. 4, and as it will be explained later in greater detail, the optical assembly 12 is mounted in part within the slider 10, for directing a read-write laser beam (or light beam) 14 onto and from a data storage medium, such as an optical or a magneto-optical disk 15.

According to one embodiment of the present invention, the optical assembly 12 includes a linearly polarized diode laser source (not shown) operating in a visible or near ultraviolet frequency region and emitting an optical power sufficient for reading and writing data onto and from the disk 15. The laser diode source may be a RF (radio frequency) modulated laser source. In an exemplary embodiment the linearly polarized laser source is selected to operate within a range of 635–685 nm; however, a laser source of other frequencies can alternatively be used.

The optical assembly 12 includes an optical fiber 16, a mirror 20, a quarter wavelength plate 22, and a lens 24. The optical fiber 16 guides the laser beam 14 along an optical path defined by the optical assembly 12. While only one optical fiber 16 is shown for the purpose of illustration, it should be clear that additional optical fibers or other light conveying means can alternatively be employed. The laser beam 14 emanating from the optical fiber 16 impinges upon the mirror 20 and is reflected thereby onto and through the quarter wavelength plate 22. The laser beam 14 continues its travel along the optical path through the lens 24 and a magnetic coil assembly 26 onto the disk 15.

During the data writing phase, the laser beam 14 is routed by the optical assembly 12 to a magneto-optical recording layer 29 of the disk 15. The laser beam 14 lowers the coercivity of the magneto-optical layer 29 by heating a target spot 31 to a critical temperature, for example the Curie point of the magneto-optical layer 29. Preferably, the optical intensity of the laser beam 14 is held constant, while a time varying vertical bias magnetic field generated by a magnetic coil assembly 26 is used to define a pattern of "up" or "down" magnetic domains perpendicular to the disk 15. This technique is known as magnetic field modulation (MFM). As the selected spot 31 cools at the surface layer, information embodied in the laser beam 14 is encoded on the disk 15.

During the data readout phase, the laser beam 14 (at a lower intensity compared to the laser beam used in the data writing phase) is routed by the optical assembly 12 to the disk 14. At any given spot of interest, i.e., 31, upon reflection of the laser beam 14 from the magneto-optical layer 29, the Kerr effect causes the reflected laser beam 14 to have a rotated polarization of either clockwise or counter clockwise sense that depends on the magnetic domain polarity at the spot 31.

In the present embodiment, the optical path of the laser beam 14 is bi-directional. The reflected laser beam 14 is received through the optical assembly 14 and propagates along the optical fiber 16 to exit at one of its ends for subsequent conversion to an electrical signal. Additional operational details of the optical assembly 12 can found in U.S. Pat. No. 5,903,525, which is incorporated herein by reference.

The slider 10 includes a body 11 which is dimensioned to accommodate the physical size and weight of the optical assembly 12, as well as the working distances along the optical path, between a forward end 33 of the optical fiber 16, the mirror 20, the lens 24 and the magneto-optical layer 29 of the disk 15. The dimensions of the slider 14 do not strictly comply to industry standards (refer to Table I above). Rather, the slider 10 is dimensioned to accommodate the dimensional constraints of the optical assembly 12. In general, the height of the slider body 11 ranges, for example between approximately 876 µm and approximately 902 µm, and the slider body planar footprint ranges, for example between approximately 1975 µm×1552 µm, and approximately 2089 µm×1645 µm. In a preferred embodiment, the slider 10 has a height H (FIG. 4) about that of a mini slider, i.e., approximately 889 µm, and the planar footprint area corresponding to that of a nano slider, i.e., a length L of approximately 2032 µm and a width W of approximately 1600 µm (FIG. 2).

With further reference to FIG. 2, the optical fiber 16 is secured to the slider 10 along a fiber channel (also referred to as the first channel) 40 formed on or within the upper surface (i.e., top) of the slider 10, and extends along substantially the entire length of the slider 10.The channel 40 is sufficiently wide to receive the optical fiber 16. The width w1 of the first channel 40 ranges, for example between approximately 114 µm and approximately 140 µm. In a preferred embodiment the width w1 is approximately 127 µm. The optical fiber 16 is placed within the channel 40, in a recessed position, and the channel 40 is filled with an ultraviolet curing epoxy or similar adhesive material to secure the optical fiber 16 to the slider 10.

The channel 40 terminates at its forwardmost end 42 in an opening 43A (FIG. 1) which is relatively larger in size than the width w1 of the fiber channel 40. Although, in a preferred embodiment the fiber channel 40 is located in proximity to a longitudinal side 43 of the slider 10, a person of ordinary skill in the art will recognize that the fiber channel 40 can be located at other positions on the slider 10, for example, between the longitudinal side and a central axis or, alternatively, along the central axis itself.

A transverse channel 44 (also referred to as adhesive stop channel) extends at an angle relative to the fiber channel 40. In a preferred embodiment, the transverse channel 44 is substantially perpendicular to the fiber channel 40, across substantially the entire width of the slider 10. The fiber channel 40 crosses the transverse channel 44 at an edge 41. The width w2 of the transverse channel 44 is, for example approximately 127 µm. The transverse channel 44 acts as a stop for the adhesive material within the fiber channel 40, to prevent the adhesive material from flowing to the mirror 20 and affecting the integrity of the optical path. Thus, excess adhesive material is allowed to flow into the transverse channel 44. Although, in a preferred embodiment the transverse channel 44 is located in proximity to a trailing edge or side 51 (FIG. 1) of the slider 10, a person of ordinary skill in the art will recognize that the transverse channel 44 may be located at other positions on the slider 10.

The forward end 33 of the optical fiber 16 projects in part within the transverse channel 44, and is raised above the bottom 45 (FIG. 4) of the transverse channel 44 to prevent excess adhesive material from flowing against, and obstructing the path of travel of the laser beam 14. The forward end 33 is directed toward the mirror 20, and is positioned at a predetermined distance therefrom. The laser beam 14 emanating from the fiber 16 traverses the forward portion 46 of the fiber channel 40 and impinges upon a target field 50 on the mirror 20, along an unobstructed path. To this end, the transverse channel 44 prevents the adhesive material from flowing into the forward portion 46 of the fiber channel 40. The forward end 33 of the optical fiber 16 is positioned at an optical path distance "a" from the target field 50 of the mirror 20. In one embodiment the distance "a" is approximately 450 µm, though this value can vary in other embodiments.

Considering now the trailing edge 51 of the slider 10, it is formed of a flat slanted or angled surface 55 (FIG. 1) upon which the mirror 20 is mounted. The mirror 20 deflects the laser beam 14 from the optical fiber 16 toward the lens 24. In a preferred embodiment, the slanted surface 55 is disposed at an angle of approximately 45 degrees, so that the light beam 14 is reflected at a right angle by the mirror 20 (FIG. 4).

Figure 3:
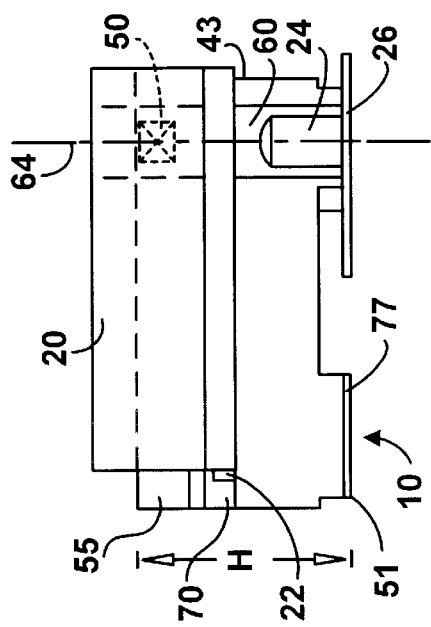
FIG. 3 is a front view of the slider and optical assembly of FIG. 2.

With reference to FIGS. 1, 3 and 4, the trailing edge 51 also includes an upright or vertical channel 60 which is in optical communication with the fiber channel 40, for housing the lens 24, and for defining a portion of the optical path along which the laser beam 14 travels. The width of the vertical channel 60 ranges, for example between approximately 214 µm and approximately 240 µm, and is preferably approximately 227 µm. The center line 64 of the optical path is co-aligned with the focal axis of the lens 24 (FIG. 3), and is positioned at a distance of approximately 803 microns from the longitudinal side 43 of the slider 10.

The trailing edge 51 further includes a lateral channel 70, disposed at approximately the center of the trailing edge 51 (FIG. 1) for receiving the quarter wavelength plate 22. The lateral channel 70 lies in a plane that is generally normal to the planes of the fiber channel 40 and the vertical channel 60. The lens 24 is fitted within the vertical channel 60 underneath the quarter wavelength plate 22 to achieve focus of the laser beam 14 as a focused optical spot 31. According to another embodiment, the lens 24 is fitted within the lateral channel 70 along the path of travel of the laser beam 14. The bottom of the lens 24 is slightly recessed relative to the air bearing surface 77 defined by the twin rails 80, 82 (FIG. 5) of the slider 10. A relief 83 (FIG. 5) is formed between the two rails 80, 82. The magnetic coil assembly 26 is secured to the bottom of the lens 24 (FIG. 4), and has a thickness "t1" of, for example approximately 31 μm. After the slider 10 and the optical assembly 12 are assembled, the upper surface of the slider 10 is secured to a suspension. Two peripheral grooves 53 are formed along the two opposite sides 43 to simplify the assembly of the optical components onto the slider 10.

With reference to FIG. 4, and according to one embodiment of the present invention, the lens 24 is a GRIN lens. The lens 24 includes at its bottom end a planar surface and at the opposite end a convex surface with a radius of curvature of approximately 190 μm. The lens 24 has a diameter of approximately 250 μm, and a length of approximately 329 μm. An optical path length "b" from the target field 50 of the mirror 20 to the convex surface of the lens 24 is approximately 443 μm. While one exemplary embodiment of the lens 24 has been described, it will be appreciated that other types and geometries of the lens 24 are possible.

The optical assembly 12 presents constraints on the slider height. For instance, the optical assembly 12 should generate a small enough spot 31 on the disk 15. If the slider height "H" is excessive, the slider center of gravity will shift upward, affecting the head stability, and reducing the access time.

In one embodiment the mirror 20 is a steerable micromachined mirror assembly, and includes a generally 300 μm square reflective target field 50. Fine tracking and short seeks to a series of nearby tracks may be performed by rotating the reflective target field 50 about a rotation axis so that the propagation angle of the laser beam 14 is changed before transmission to quarter wavelength plate 22. The reflective target field 50 is rotated by applying a differential voltage to a set of drive electrodes. The differential voltage on the electrodes creates an electrostatic force that rotates the reflective target field 50 about a set of axial hinges (not shown), and enables the focused optical spot 31 to be moved in the radial direction of the disk 15. Wires 50A are connected to the mirror 20 for providing dithering and other control signals. The mirror 20 may include a piezzo-electric element that enables the dithering for fine tracking of the laser beam 14.

The magnetic coil assembly 26 may be of the type described in U.S. Pat. application titled "Magnetic Coil Assembly", Ser. No. 08/844,003, filed on Apr. 18, 1997.

Those skilled in the art will recognize that positioning the optical assembly 12 at other than along the central axis of the slider 10 may affect the center of mass of the head, and thus its flying dynamics. Accordingly, the point of attachment of the head to a suspension (not shown), may require adjustment to compensate for off-center changes in the center of mass of the head. In one embodiment, the channels 40, 44, 60, 70 are designed as V-grooves, or any other suitable channels for coupling the optical assembly 12 to the slider 10 and for aligning it relative to the suspension and the disk 15.

Figure 5:
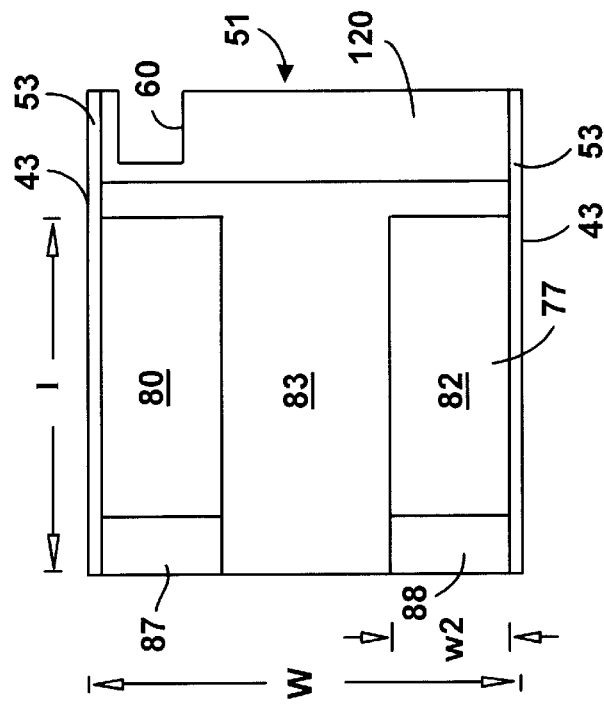
FIG. 5 is a bottom plan view of the slider of FIG. 1 without the optical assembly.

With reference to FIG. 5, the rails 80, 82 define the positive pressure air bearing surface 77 of the slider 10, and do not extend along the entire length of the slider 10. This enables the slider 10 to accommodate the optical assembly 12 and the higher frequency of axial modulation around the disk 15. In an exemplary embodiment, the length "l" of each rail 80, 82, including its corresponding taper 87, 88 is, for example approximately 1,701 μm. The length of each taper 87, 88 is, for example approximately 203 μm. In operation, the plane of the air bearing surface 77 is for example approximately 0.4 μm from the upper surface of the rotating disk 15.

The width of the symmetrical rails 80, 82 is preferably increased over those of conventional sliders, in order to compensate for the relatively short rail length and to provide the required air bearing surface. An exemplary width "w2" of the rails 80, 82 and that of the tapers 87, 88 is approximately 460 μm. While the slider 10 has been described as having the footprint of a nano slider and the height of a mini slider, it should be understood that other size variations are possible provided they meet the physical and the optical path length requirements of the optical assembly 12, without compromising the aerodynamic performance of the head. For illustration purpose, each rail has its width to length ratio ranging between approximately 0.26 and approximately 0.28, with a more preferred value of approximately 0.27.

The slider 10 is a platform that acts as a carrier to mount optical components as well as writing field components onto a slider for optical recording or MO (magneto-optical) recording.

Figure 6:
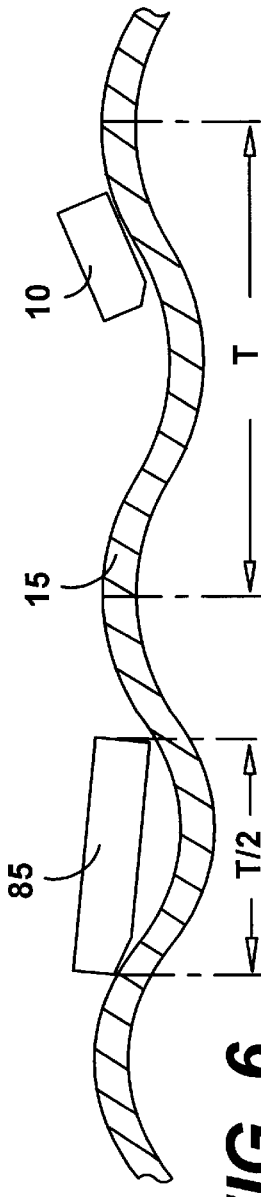
FIG. 6 is a greatly enlarged sectional view of the disk showing a slider according to the present invention and a conventional slider flying over the disk.

FIG. 6 illustrates the slider 10 of the present invention and a conventional slider 85 flying over the disk 15. The disk 15 can be made of plastic material and as a result, its microscopic surface is typically foil shaped and irregular. Plastic disks usually present excessive warpage compared to aluminum or glass disks, but allow servo patterns to be easily and inexpensively stamped.

To illustrate, the plastic disk 15 shown in FIG. 6 may have an undulation period T (i.e., the distance between two successive peaks or valleys) of approximately 8,000 μm, that is about twice the length of a conventional mini slider 85. As it can be appreciated, the conventional slider 85 does not effectively negotiate the wavy surface of the disk 15, and may lead to head crashes. On the other hand, the slider 10 of the present invention has about one half the length of the mini slider 85 and can effectively "rideo or negotiate the surface of the disk 15, thus effectively minimizing head crashes. In certain embodiments, the length of the slider body 11 ranges between approximately 25 percent and approximately 75 percent of the undulation period T.

The slider 10 may be obtained by slicing a wafer into a plurality of individual die, with the channels 40, 44, 60 and 70 formed in at least some of the die. The slider 10 can be made of hard material such as titanium carbide. Alternatively, the slider 10 may be prefabricated or molded from calcium titanate or another suitable material, either individually, or sliced from a row bar of sliders. In other embodiments, the slider 10 may be formed of suitable material such as silicon, by various available techniques such as hot isostatic press process (HIP), reactive etching, ion beam etching, or other etching or machining processes.

Figure 7:
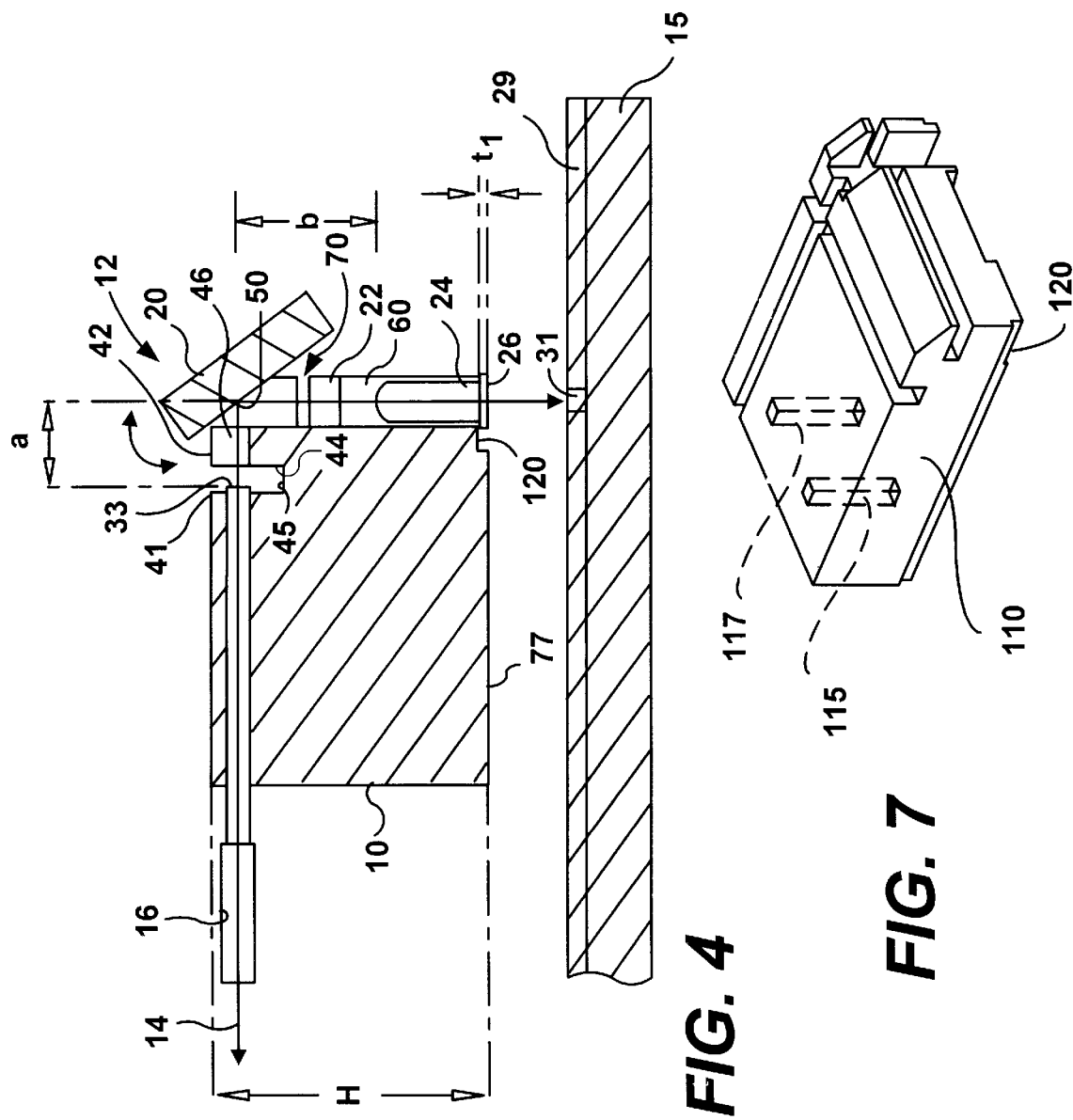
FIG. 7 is a perspective view of a slider according to another embodiment of the present invention.

FIG. 7 shows a molded slider 110. By molding the slider 10 it is now possible to achieve complex geometrical slider designs in a single molding process, since the a manufacturing complexity is transferred to the reusable mold design. Another aspect of the molding process is that cavities or vias 115, 117 can be formed inside or on the surface of the slider 10, to further reduce the slider mass, for faster access time and also to reduce the electrical current requirements to drive the HGA actuator, since a lower slider mass significantly affects the polar moment of inertia of head. Moreover, for positive pressure air bearing designs such as the twin taper flat illustrated in FIG. 5, specific geometries can be achieved by the molding process.

Another advantage of forming cavities within the slider 10 is the ability to optimize the location of the slider center of gravity to account for the optical assembly 12 loaded thereon. While only two cavities 115, 117 are shown, it should be understood that additional cavities can be formed, patterned, and distributed throughout the slider volume.

With further reference to FIGS. 4, 5 and 10, they illustrate a stepped groove 120 formed in the underside of the slider 10 in proximity to the trailing edge 51. The coil assembly 26 is disposed within the groove 120, where it is secured to the lens 24 and the air bearing surface 77 of the slider 10 by means of an adhesive layer 121. The groove 120 has a depth "d" that ranges for example between approximately 15 microns and approximately 45 microns, and preferably between approximately 28 microns and approximately 31 microns. The groove 120 simplifies the precise positioning and alignment of the lens 24 and the coil assembly 26 relative to the air bearing surface 77.

Figure 8:
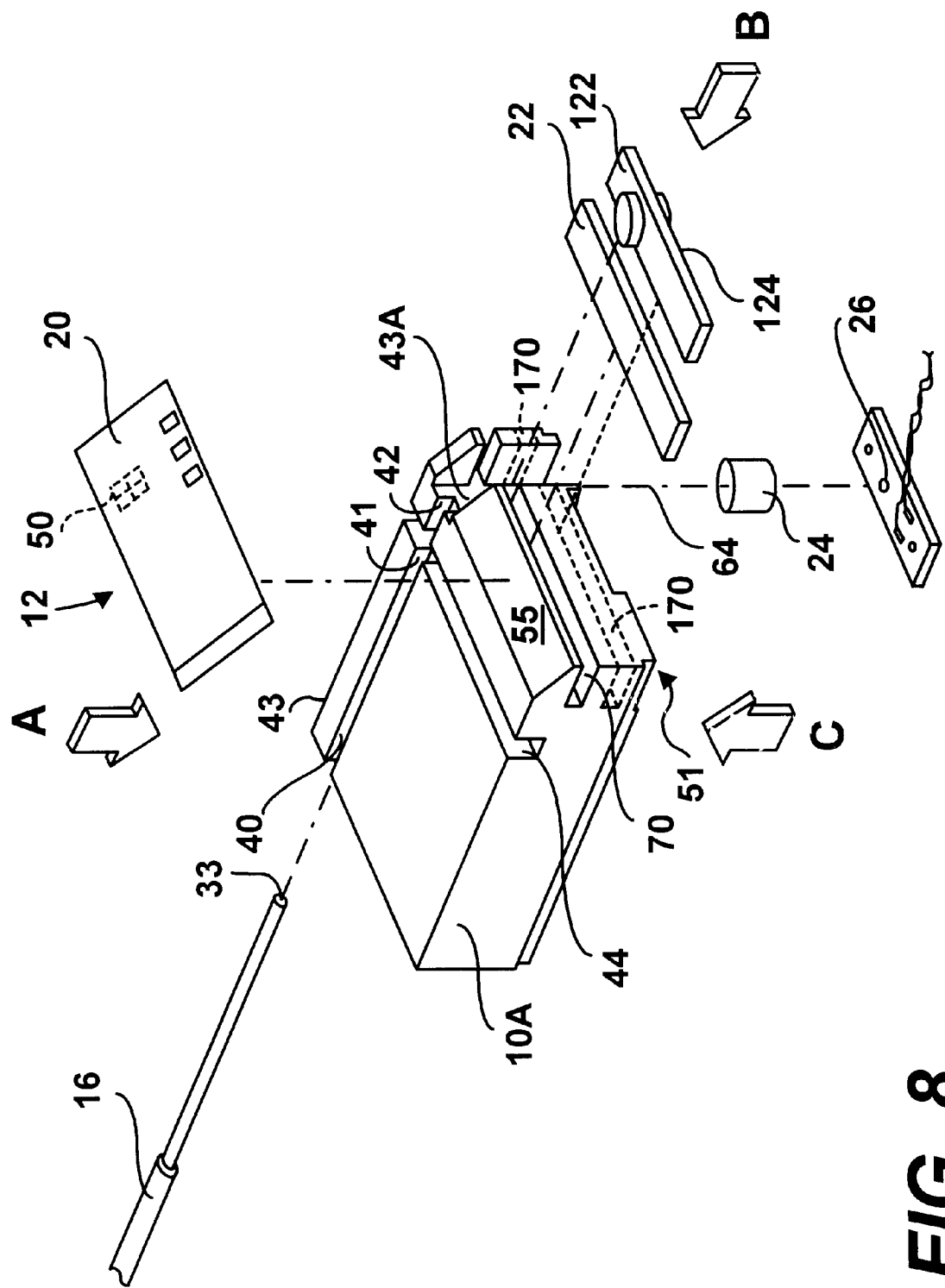
FIG. 8 is an exploded, perspective view of an alternative slider design according to the present invention.

FIG. 8 is an exploded, perspective view of another slider 10A according to the present invention. Slider 10A is substantially similar in design and function to the slider 10, with the lateral channel 70 being dimensioned to receive one or more additional optical components such as a lens 124. To this end, the optical component or lens 124 can be mounted on a carrier 122 which is inserted within, and secured to the lateral channel 70. Carrier 122 provides a convenient way for handling the optical components mounted thereon, and is preferably flat. The carrier 122 can be made of the same material as the slider 10. The width of the lateral channel 70 can vary between approximately 150 microns and approximately 400 microns, and preferably between approximately 242 microns and approximately 292 microns.

In yet another embodiment, the slider 10A includes one or more additional lateral channels 170 (shown in dashed lines) within which one or more carriers (similar to carrier 122) or optical components (similar to the quarter wavelength plate 22) are inserted.

FIG. 9 is a top plan view of another slider 140 showing an alternative channel configuration or pattern formed on the top or upper surface of the slider body 11, for securing various optical, magnetic and/or electrical components on the slider 140. In the example illustrated in FIG. 9 the channel configuration includes a plurality of channels 142, 143, 144, 145 along which a plurality of cavities 146, 147, 148, 149, 150, 151, 152, 153, 154 are formed to receive and retain various optical, electronic, or other components along the optical path, or to regulate the optical path of the laser beam or beams 14. For illustration purpose, a splitter or reflective surface 160 (shown in dashed lines) is disposed, aligned, and secured within the cavity 152 to split or reflect the laser beam 14. The dimensions of the channels 142, 143, 144, 145 and the cavities 146, 147, 148, 149, 150, 151, 152, 153, 154 can be selected for optimal performance of the head incorporating the slider 140.

Figure 11:
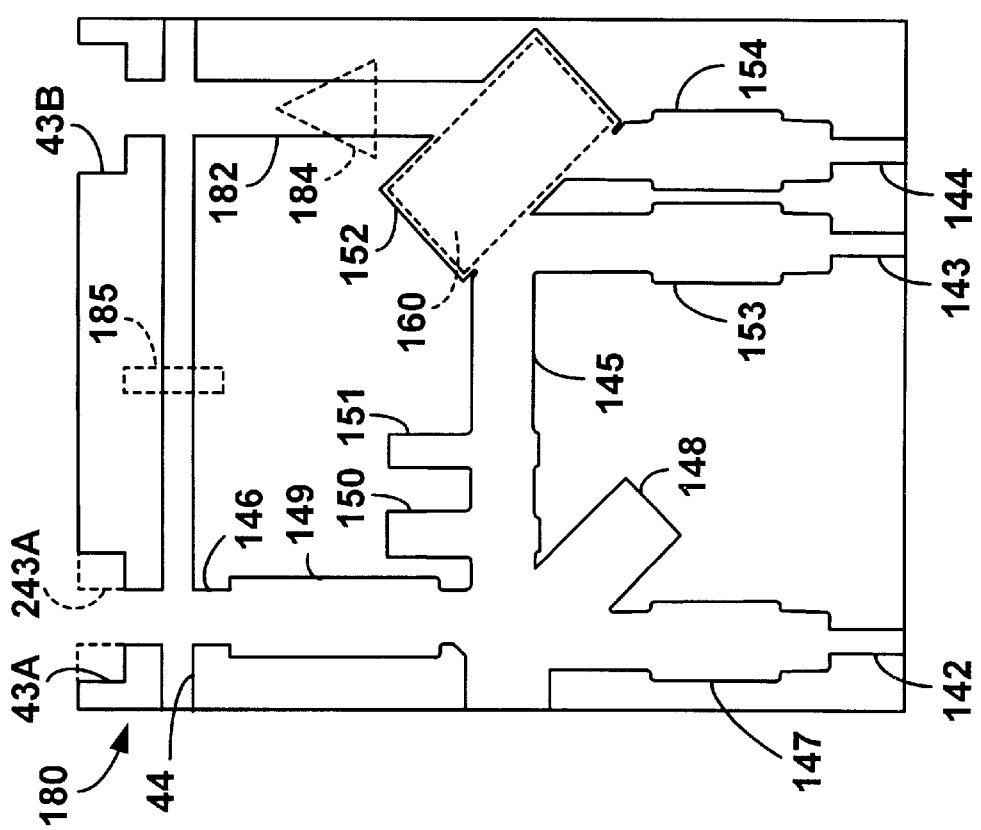
FIG. 11 is a top plan view of a further slider design showing another alternative channel configuration.

FIG. 11 is a top plan view of yet another slider 180 showing an alternative channel configuration for securing various optical and/or components on the slider 180. In this example, the channel configuration is generally similar to the channel configuration of slider 140 (FIG. 9), but further includes an additional trailing edge opening 43B which is similar to opening 43A, and another channel 182 that connects the splitter 160 to the opening 43B. An optical component such as a prism or a lens 184 (shown in dashed lines) can be disposed along channel 182. It should be understood that the channel configurations of FIGS. 1, 9 and 11 are shown only for illustration purpose, and that other channel configurations are possible. For example, in one channel configuration the enlarged opening 43A is replaced with another opening 243A (shown in dashed lines) having approximately the width of the cavity 146 (FIG. 11) or the width of the fiber channel 40 (FIG. 1).

Figure 12:
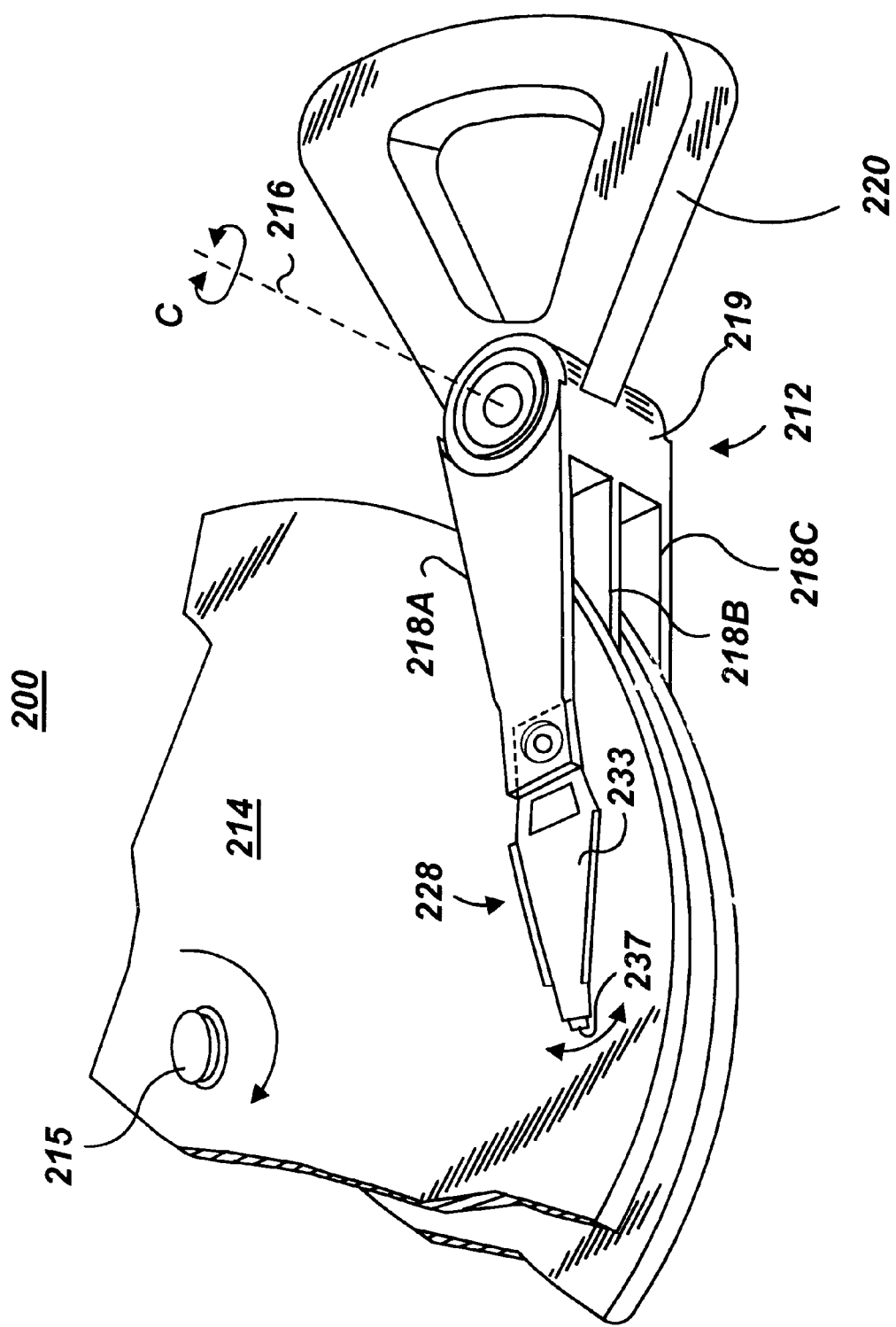
FIG. 12 is a fragmentary, perspective view of a head stack assembly using a head and head gimbal assembly according to the present invention.

FIG. 12 illustrates a disk drive 210 comprised of a head stack assembly 212 and a stack of spaced apart optical or MO data storage disks or media 15 that are rotatable about a common shaft 215. The head stack assembly 212 is rotatable about an actuator axis 216 in the direction of the arrow C. The head stack assembly 212 includes a number of actuator arms, only three of which 218A, 218B, 218C are illustrated, which extend into spacings between the disks 15.

The head stack assembly 212 further includes an actuator block 219 and a magnetic rotor 220 attached to the block 219 in a position diametrically opposite to the actuator arms 218A, 218B, 218C. The rotor 220 cooperates with a stator (not shown) for rotating in an arc about the actuator axis 216. Energizing the coil of the rotor 220 with a direct current in one polarity or the reverse polarity causes the head stack assembly 212, including the actuator arms 218A, 218B, 218C, to rotate about the actuator axis 216 in a direction radial to the disks 15.

A head gimbal assembly (HGA) 228 is secured to each of the actuator arms, for instance 218A. The HGA 228 comprises a resilient load beam 233 and a slider, such as one of the inventive sliders described herein, secured to the free end of the load beam 233. The slider is also referred to herein as a support element since it supports an optical assembly 12 and/or the electromagnetic coil assembly 26. The optical assembly 12 is secured to the HGA 228 and in particular to the slider for providing the required optical reading and writing beams.

Figure 13:
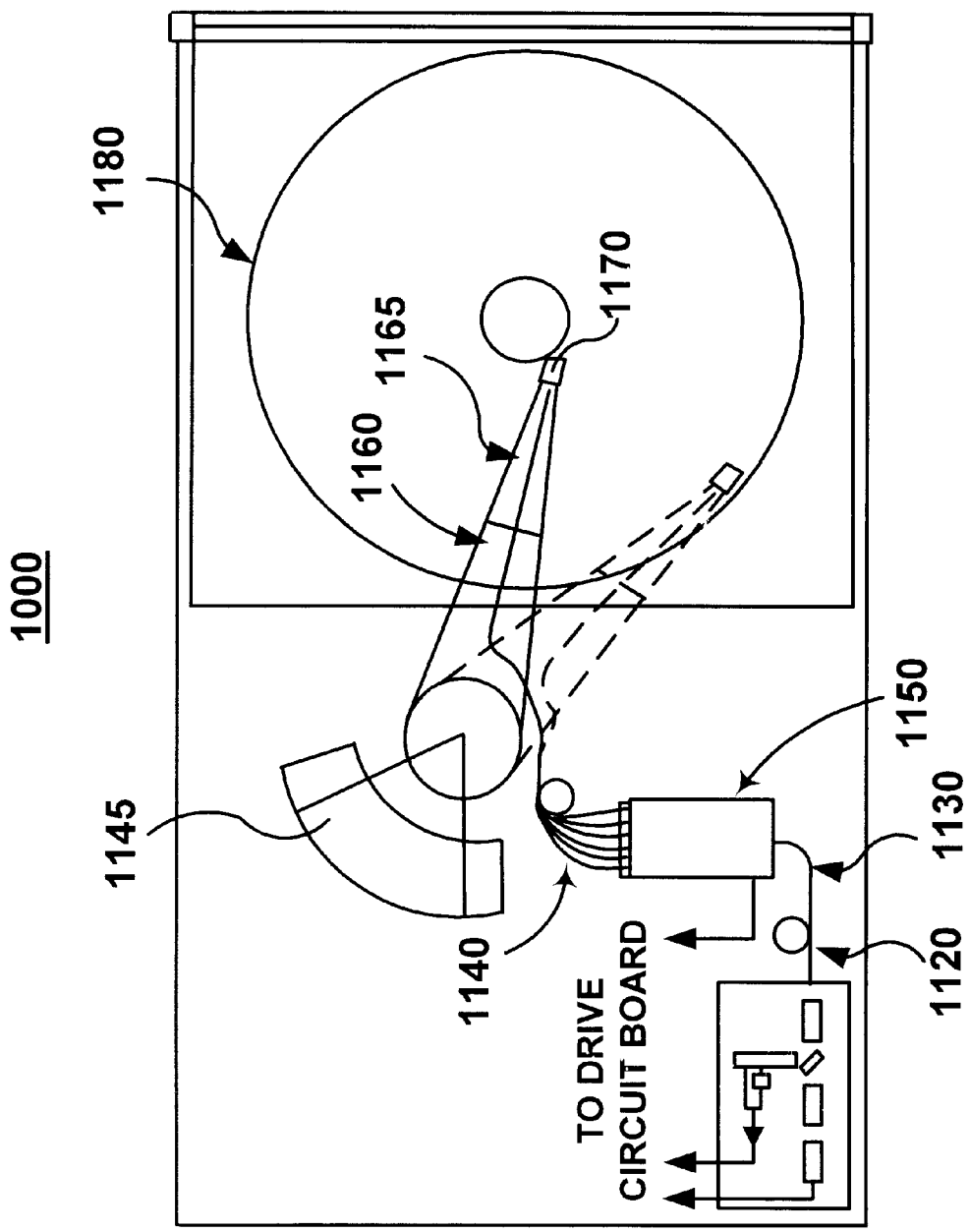
FIG. 13 is a pictorial view of a magneto-optical storage device according to the present invention.

FIG. 13 illustrates a magneto-optical (MO) storage device 1000 according to the present invention. The magneto-optical storage device 1000 includes a flying magneto-optical (FMO) head 1170 technology with Winchester-type rotary actuator arms 1160 and a suspension 1165. In a preferred embodiment, the MO storage device 1000 includes a laser-optics assembly 1110, a Single-Mode Polarization Maintaining (SMPM) optical fiber 1130, a phase compensator 1120, a fiber optic switch 1150, an actuator magnet and coil 1145, a plurality of SMPM optical fibers 1140, a plurality of arms 1160, a plurality of suspensions 1165, a plurality of MO storage media 1180, and a plurality of FMO heads 1170.

Each of the MO storage media 1180 is mounted on a spindle 1185 for continuous rotation at a constant angular velocity. Each of the FMO heads 1170 is preferably attached via a suspension 1165 and a head arm 1160 to the electromagnetic actuator magnet and coil 1145. Those skilled in the art will recognize that the MO storage device 1000 may comprise as few as one MO head 1170 and one MO storage medium 1180, or an upper and lower FMO head 1180 for a plurality of MO storage media 1180.

Figure 14:
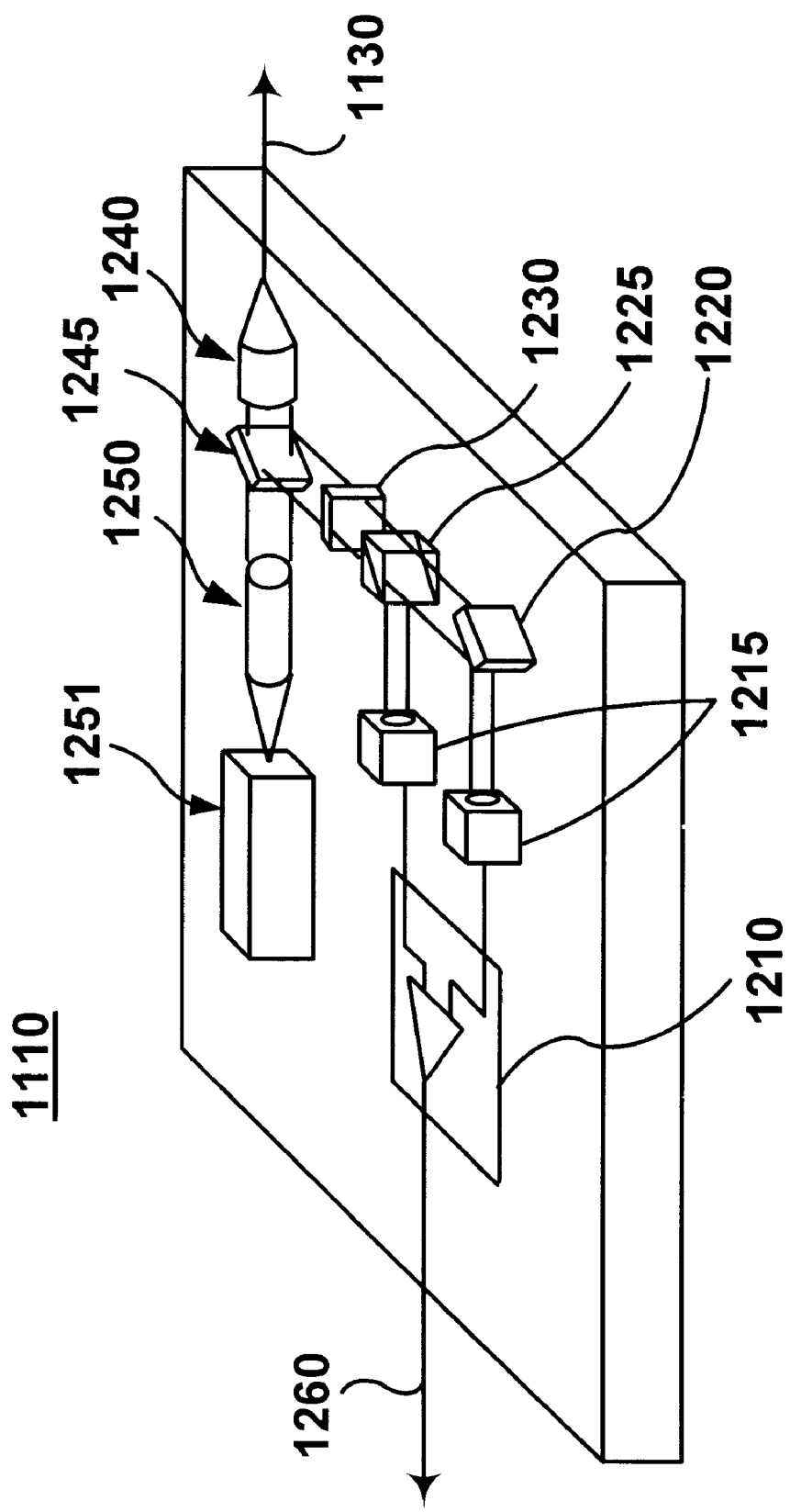
FIG. 14 is a schematic view of a laser/optics assembly used in the magneto-optical storage device of FIG. 13.

With further reference to FIG. 14 the laser/optics assembly 1110 includes a laser optical source such as a laser diode 1251, and a differential photodiode detector system and associated optical components, either as separate components, or alternatively as hybrid integrated circuit components. In a preferred embodiment, the laser diode 1251 is a polarized optical light source such as a 30–40 mW laser diode or a diode-pumped micro-chip laser operating in the visible or near ultraviolet region (preferably in the vicinity of 635 nm). The laser/optics assembly 1110 further includes a leaky beam splitter 1245, collimating optics 1250 disposed intermediate the laser diode 1251 and the leaky beam splitter 1245, and a coupling lens 1240, such as a Gradient Refractive Index (GRIN) lens that focuses the outgoing optical beam from the leaky beam splitter 1245 into a Single-Mode Polarization-Maintaining (SMPM) optical fiber 1130 feed.

In the present exemplary embodiment a phase compensator 1120 is used to compensate for relative phase fluctuations that occur between the inherent dual polarization modes of each of the polarization-maintaining optical fibers 1130 and 1140 (FIG. 13). Each of the polarization modes of the optical fibers 1130 and 1140 experiences different refractive indices because of the inherent birefringence of the fibers 1130 and 1140. For example, relative phase fluctuations may arise because of a slight variation in a difference between the two refractive indices caused by changes in temperature, pressure, and mechanical motion of each of the optical fibers 1130 and 1140. These fluctuations may be sensed by the laser-optics assembly 1110, and before significant changes occur, a feedback servo (not shown) adjusts the phase compensator 1120 to cancel the fluctuation. In this way, an optical path formed by the optical fibers 1130 and 1140, to and from the flying MO head 1170, my be treated similar to a free-space optical path in terms of its polarization properties.

In a preferred embodiment the phase compensator 1120 includes a piezoelectric cylindrical shell preferably made of a piezoelectric material such as lead zirconate titanate, to form a phase modulator. The phase compensator 1120 has a height preferably less than its diameter to provide a low-profile shape suitable for use in a compact magneto-optical storage system with reduced electrical capacitance for faster operation.

The optical fiber 1130 may be attached to the circumference of the phase compensator 1120 with an ultraviolet-caring epoxy or another suitable adhesive. Metal electrodes are deposited on flat ends of the cylindrical shell to reduce the capacitance so that a voltage applied across the electrodes induces an expansion of the shell in a radial direction, thereby stretching the optical fiber 1130. The stretching action serves to provide phase modulation.

In order to minimize the mechanical stress on the optical fiber 1130, the diameter of the phase compensator 1120 is preferably greater than a few hundred times the cladding diameter of the optical fiber 1130. For example, a fiber cladding diameter of approximately 80 microns corresponds to a phase compensator 1120 diameter in the vicinity of 10 nm to 40 nm.

In the present exemplary embodiment, the fiber optic switch 1150 (FIG. 13) accepts the SMPM optical fiber 1130 at an input port and routes the optical beam emanating from this fiber 1130 to one of the SMPM optical fibers 1140 at an output port. The switching properties of the fiber optic switch 1150 are bidirectional so that the optical beam propagating back to the switch 1150 along any one of the SMPM optical fibers 1140 at the output port may also be routed to the optical fiber 1130 at the input port.

The SMPM optical fibers 1140 from the fiber optic switch 1150 are preferably routed along respective head arms 1160 and suspensions 1165 to respective FMO heads 1170. In the preferred embodiment, there is one SMPM optical fiber 1140 for each FMO head 170, and the fiber optic switch 1150 is used to select the MO head 1170 is active for reading data from, or writing data on the MO storage medium 1180.

During the writing phase, light is delivered through an individual optical fiber 1140 to a respective FMO head 1170 for the purpose of focally heating a respective surface of a rotating MO storage medium 1180, thereby producing a "hot spot". A magnetic coil secured to, or formed on the FMO head 1170 is used to produce a magnetic field, which, in turn, magnetizes the region within the hot spot with a vertical orientation either "up or down". Thus, as the MO storage medium 1180 rotates, the applied magnetic field is modulated so as to encode digital data as a pattern of "up or down" magnetic domain orientations.

During the readout phase, a polarized light beam 14 at a lower intensity is delivered through an SMPM optical fiber 1140 to a respective FMO head 1170 for the purpose of probing or scanning the rotating storage medium 1180 with a focused optical spot. Readout is performed in such a way that the magnetization direction of the MO storage medium 1180 at the location of the focused spot alters an optical polarization of the light beam 14 via the magneto-optical Kerr effect. In this way, the pattern of "up or down" magnetization orientations representative of the stored digital data modulates the polarization of the light beam 14 reflected from the MO storage medium 1180. The reflected light signal from the MO storage medium 1180 then couples back through the FMO head 1170, one of the plurality of SMPM optical fibers 1140, and the fiber optic switch 1150, finally reaching two photodiode detectors 1215 for conversion into electronic format by a differential amplifier 1210.

Figure 15:
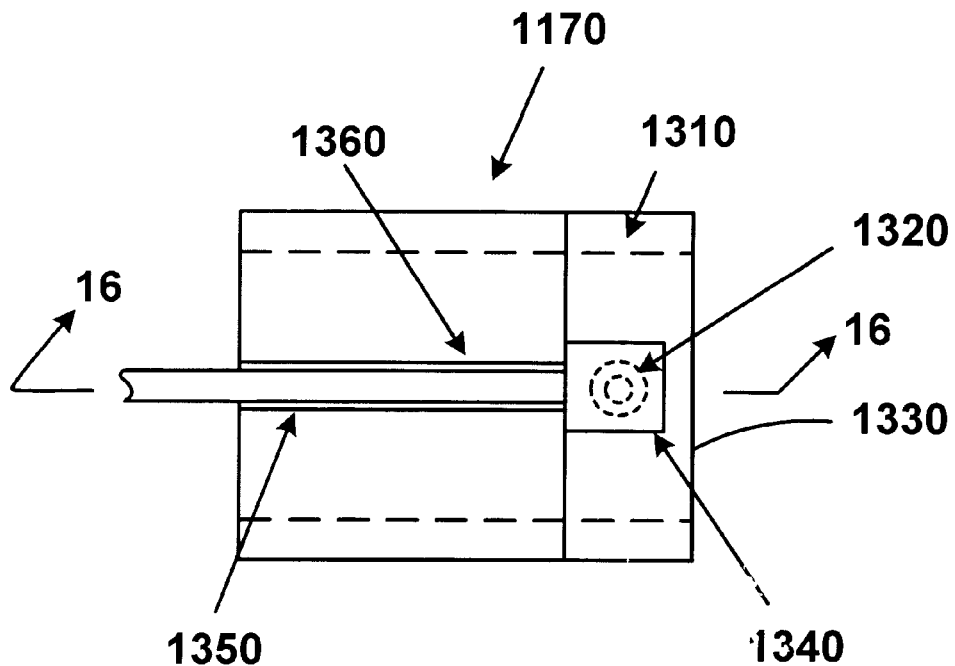
FIG. 15 is a top view of a flying magneto-optical head according to the present invention, forming part of the magneto-optical storage device of FIG. 14.

Referring now to FIG. 15, each FMO head 1170 includes a slider body (or slider) 1330. The FMO head 1170 further includes a groove or channel 1360, a steerable micromachined mirror 1340, and a magnetic coil 1310. The groove 1360 can for example be V-shaped for retaining a SMPM fiber 1350.

Figure 16:
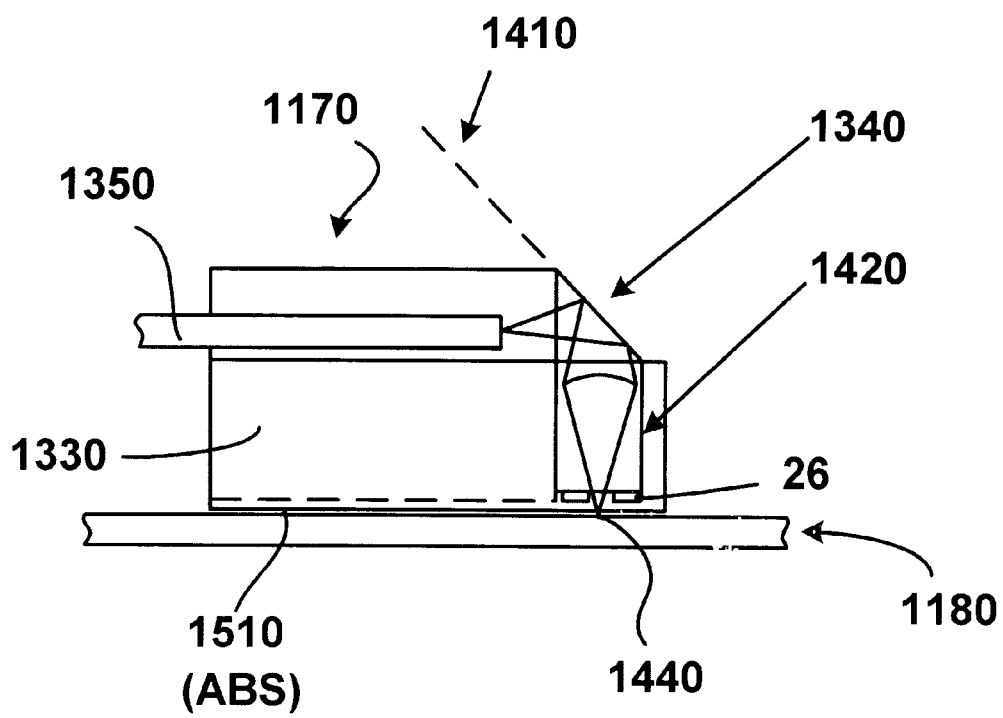
FIG. 16 is a cross-sectional, side view of the magneto-optical head of FIG. 15, taken along line 16—16.
Figure 17:
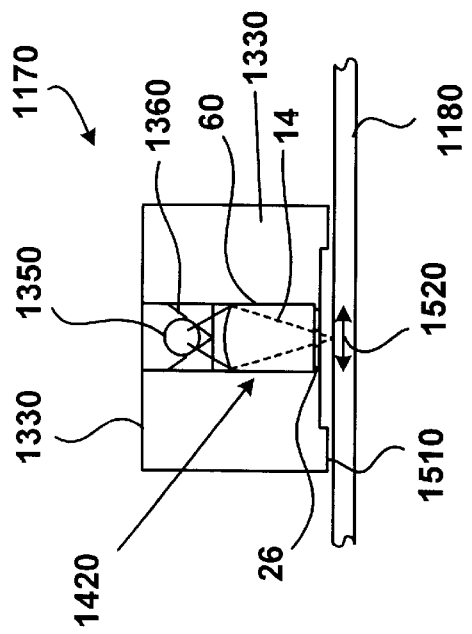
FIG. 17 is a front view of the magneto-optical head of FIG. 15.

With further reference to FIGS. 16 and 17, the FMO 1170 utilizes the air bearing surface (ABS) 1510 of the slider 1330 that flies above or below a coated upper surface of the MO storage medium 1180. A polarized beam of laser light is transmitted through the SMPM optical fiber 1350 to the mirror 1340. The axis of the V-groove 1360, and hence the axis of the fiber 350 lying in the groove 1360, is substantially parallel to the medium 1180 surface. Light exiting the fiber 1350 is reflected by the mirror 1340 at an average angle of approximately ninety degrees relative to the axis of the optical fiber 1350.

The reflected light is directed through an embedded micro-objective lens such as a GRIN lens 1420. Fine tracking and short seeks to adjacent tracks are performed by rotating the mirror 1340 about a rotation axis 1410 (shown in FIG. 16). In this way a focused optical spot 1440 (FIG. 16) is scattered back and forth in a direction 1520 (illustrated as an arrow in FIG. 17) which is substantially parallel to the radial direction of the medium 1180. As the actuator arm 1160 moves the slider body 1330 back and forth across the surface of the medium 1180, the position of the slider body 1330 may become skewed slightly such that the direction 1520 is not precisely parallel to the radial direction of the MO storage medium 1180. Although not precisely parallel, the skew angle is sufficiently small that a substantial component of the scanning direction 1520 lies along the radial direction of the storage medium 180.

Figure 18:
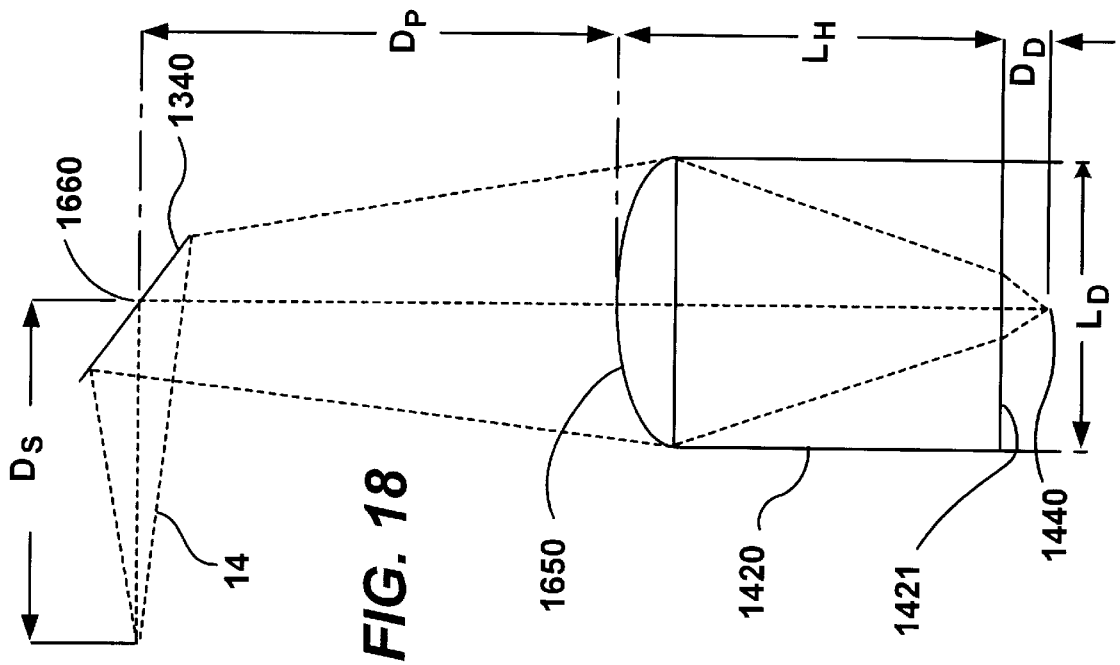
FIG. 18 is a side view showing a beam path through the magneto-optical head of FIG. 15.

FIG. 18 illustrates the light path through an exemplary lens 1420 of the present invention. The light beam 14 is reflected from the 1340 is collected by a focusing optic comprising an objective GRIN lens 1420 that focuses the reflected light beam 14 onto the surface of the storage medium 1180.

The position of the optical fiber 1350 within the groove 1360 may be adjusted, thereby changing the distance from the end of the SMPM optical fiber 1350 to the mirror 1340. Relocating the position of the SMPM optical fiber 1350 within the groove 1360 effectively adjusts the location of the focal point 1440 of the light beam 14. Once the fiber 1350 is positioned for proper focus on the surface of the medium 1180, the fiber 1350 may be secured in place by means of ultraviolet (UV) curing epoxy or similar adhesive.

The use of a cylindrically shaped GRIN lens 1420 allows the lens 1420 to be inserted easily into the vertical channel 60 the slider body 1330. To minimize spherical aberrations and to achieve diffraction-limited focusing, the lens 1420 is polished to assume a plano-convex shape with the convex surface 1650 being a simple spherical shape. The height $L_H$ 1640 of the lens 1420 depends on a number of factors including the magnitude of the refractive index gradient, the wavelength of the light beam, the numerical aperture of the SMPM fiber 1350, and the desired size of the focused optical spot 1440 as determined by the effective numerical aperture of the lens 1420. In a preferred embodiment, the lens height $L_H$ 1640 ranges between approximately 170 microns and approximately 500 microns, the lens radius of curvature ranges between approximately 150 microns and approximately 400 microns, and the lens diameter $L_D$ ranges between approximately 200 microns and approximately 500 microns.

While the FMO head 1170 illustrated in FIGS. 15 through 17 is shown to include a GRIN lens 1420, it will be appreciated by those skilled in the art that additional objective optics can also be used to enhance the properties of the lens 1420. For example, the focusing objective optics may include either an aplanatic lens or a solid immersion lens in conjunction with the GRIN lens 1420. The use of such an additional lens element can achieve a larger numerical aperture and hence a smaller size focused optical spot 1440. A smaller spot size permits higher areal data densities to be written to and from the MO storage medium 1180.

Micro-optic lenses made by molding glass or plastic can be used in place of the GRIN lens 1420. For example, two molded plano-convex aspherical lenses can be combined by placing the two convex surfaces toward each other to provide a miniature lens component with high numerical aperture and good off-axis performance as the mirror 1340 is rotated or moved. In a dual aspherical optical design, the light beam 14 is substantially collimated between the two optical elements, allowing a quarter wave plate to be placed between the two elements without additional lenses.

In another embodiment, a single spherical lens with low numerical aperture (i.e., 0.2–0.4) may be used in conjunction with an aplanatic or solid immersion lens to yield an optical focusing system with a relatively high numerical aperture (i.e., greater than 0.6).

From a manufacturing perspective, molded lenses are attractive because they can be mass produced at low cost. One such mass production method involves molding a lens array and subsequently sectioning the array by diamond saw cutting or laser cutting to obtain Individual lenses. Regarding the aforementioned two-lens design, two molded plano-convex lens arrays may be secured together by means of tapered fittings before sectioning, to ensure accurate lens alignment.

According to another preferred embodiment of the present invention the micro plano-convex GRIN lens 1420 is made by polishing a conventional a plano-plano GRIN rod lens so as to provide a convex surface at the planar end of the GRIN rod lens. In an exemplary embodiment, the objective lens 1420 is a cylindrical plano-convex GRIN lens that includes at a bottom end a piano surface 1421 and at an opposite end a convex surface 1650 with a radius of curvature of approximately 190 microns. As compared to conventional GRIN lenses, the cylindrical and planar portions of the present GRIN lens 1440 improve the ability to align an optical axis of the lens 1440 relative to the optical path (FIG. 18) of the flying MO head 1170. The use of a single optical element GRIN lens 1420 eliminates the requirement for alignment of multiple objective optic elements relative to each other. In an exemplary embodiment, the diameter $L_D$ of the GRIN lens 1420 diameter is approximately 250 microns, and the height $L_H$ of the GRIN lens 1420 is approximately 329 microns. An optical path length $D_p$ from a center point 1660 of the mirror 1340 to the convex surface 1650 of the GRIN lens 1420 is approximately 435 microns.

The SMPM optical fiber 1350 has a numerical aperture of approximately 0.15. The distal end of the SMPM optical fiber 1350 is positioned at a distance $D_S$ of approximately 450 microns from the center point 1660 of the mirror 1340. The distance $D_D$ from the piano surface 1421 of the lens 1420 to the focal point 1440 is approximately 25 microns.

As discussed herein, the present invention uses a GRIN lens 1420 manufactured to very small dimensions. The optical and geometrical properties of the lens 1420 permit its mounting on a bottom surface of the FMO head 1170 or, alternatively, on or near other optical or magnetic components so as not to interfere with the aerodynamic flying qualities of the FMO head 1170.

Figure 19:
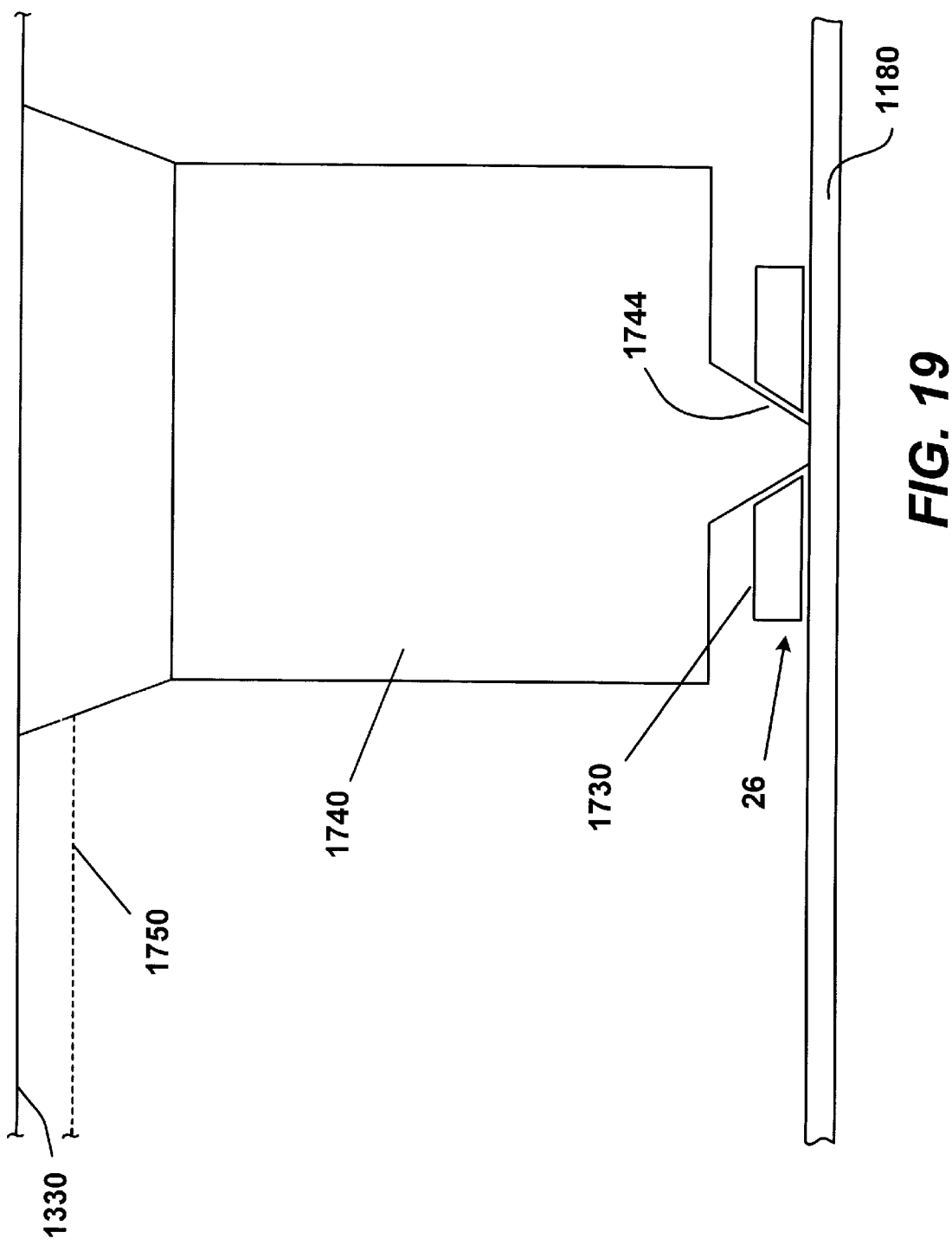
FIG. 19 is a schematic side view of the magneto-optical head of FIG. 15.

With further reference to FIG. 19, the magnetic coil assembly 26 is positioned below the GRIN lens 1420 as part of the FMO head 1170. The magnetic coil assembly 26 generates a magnetic field with a component in a direction normal (i.e., perpendicular) to the MO storage medium 1180. A vertical channel 1740 (corresponds to the vertical channel 60 in FIG. 1) into which the lens 1420 is inserted, is etched in the slider body 1330. During fabrication, the depth and diameter of the vertical channel 1740 is made to provide an unobstructed optical path to the light beam 14.

The vertical channel 1740 is patterned to include a conical portion 1744 with a cone angle approximately equal to that of the focused cone of the polarized light beam 14, for example approximately 37 degrees in half-angle for a numerical aperture of 0.6. In this way, a shelf 1730 is formed for supporting the lens 1420 while also allowing a planar magnetic coil assembly 26 to be deposited within a recessed area which is etched on the bottom side of the shelf 1730. In a preferred embodiment, the diameter of conical portion 1744 is sufficiently large to accommodate off-axis steering of the polarized light beam 14.

Figure 20:
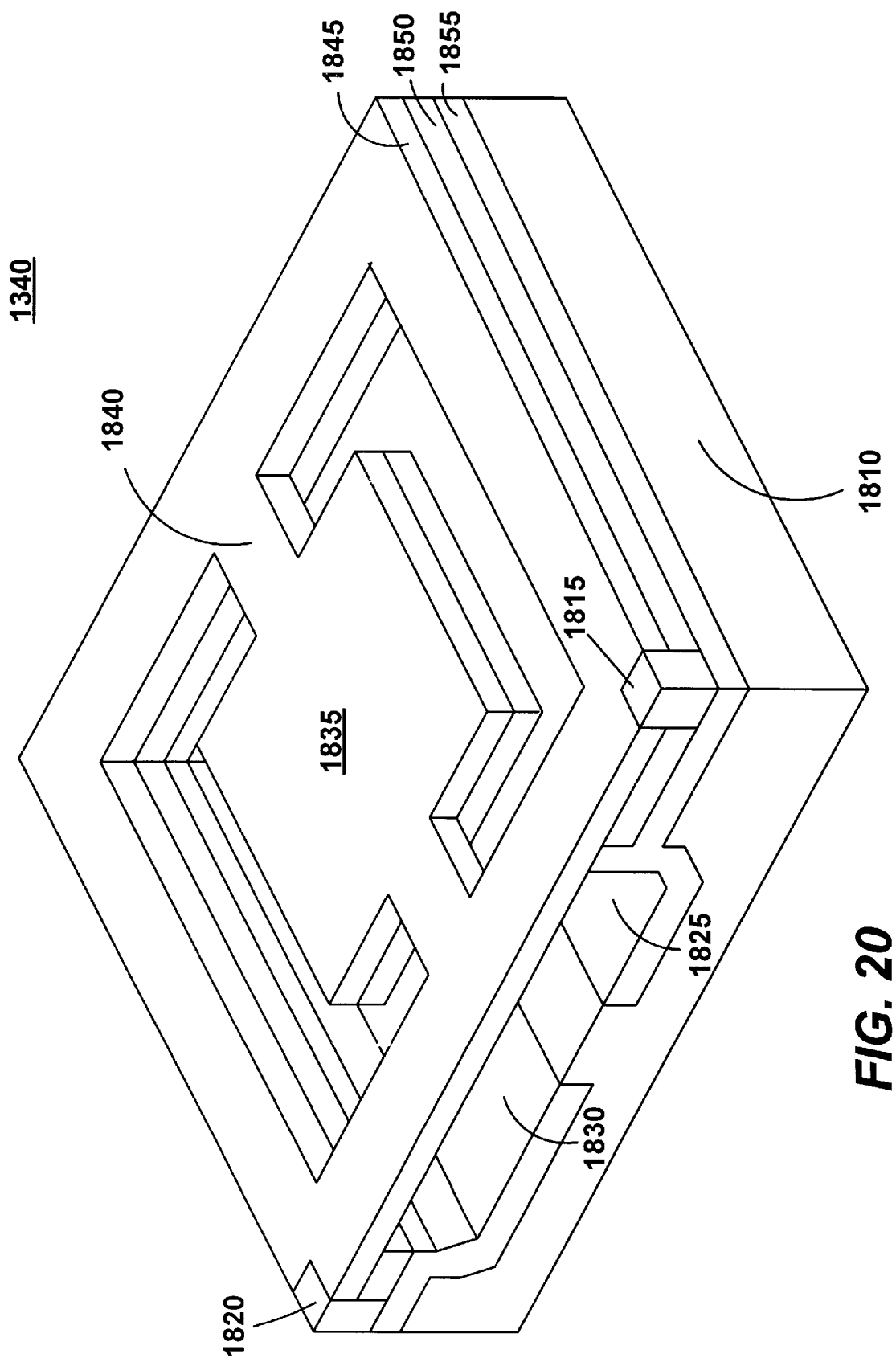
FIG. 20 is a perspective view of a micro-machined mirror used in of the magneto-optical head of FIG. 15.

FIG. 20 illustrates a preferred embodiment of the mirror 1340. The mirror 1340 is a torsional mirror comprising a silicon substrate 1810, drive electrodes 1825, 1830, bonding pads 1815, 1820, a bonded silicon plate 1850, and a thin film flexure layer 1845 made from a material such as silicon dioxide, silicon nitride, or silicon. The mirror 1340 may be fabricated using micromachining techniques to yield a reflective inner torsional reflective area 1835 comprising the flexure layer 1845 on top and a silicon plate layer 1855 on the bottom for mechanical rigidity, and supported by two flexure layer hinges 1840.

The reflective area 1835 may be metallized with gold or a similar substance to increase the optical reflectivity and to improve the electrostatic actuation of the mirror 1340. In a preferred embodiment, the mirror 1340 has a resonant frequency in the range from approximately 50 kHz to 200 kHz, as determined by the particular geometry and material properties of the mirror 1340. The mirror 1340 has a generally square shape with outer linear dimensions in the range from approximately 100 microns to 170 microns, and a thickness ranging from approximately 2 microns to approximately 50 microns.

The inner reflective area 1835 has an approximate outer linear dimension in the range from approximately 25 microns to approximately 200 microns, and a thickness of approximately 1 micron to approximately 20 microns. Preferably, the mirror 1340 may be driven torsionally without any excessive transverse motion.

In an exemplary embodiment, the side of the reflective area 1835 is preferably on the order of 100 microns. The resonant frequency of the reflective area 1835 is preferably greater than 100 kHz, and the maximum physical angular deflection is preferably 2 degrees. In addition, the mirror 1340 should preferably not warp either statistically or dynamically upon actuation and the maximum stress upon electrostatic deflection should preferably be well below the expected yield stress of the material used to construct the mirror 1340 (for example: silicon, silicon dioxide, silicon nitride, and aluminum).

The mirror 1340 is operated by applying a differential voltage to the drive electrodes 1825, 1830, which differential voltage results in an electrostatic force on the reflective area 1835. The reflective area 1835 rotates about the hinges 1840, enabling the reflected light beam to be directed and scanned back and forth about the surface of the medium 1180. A more detailed description of the operation of the mirror 1340 will be discussed hereafter, with further reference to FIG. 22.

Figure 21:
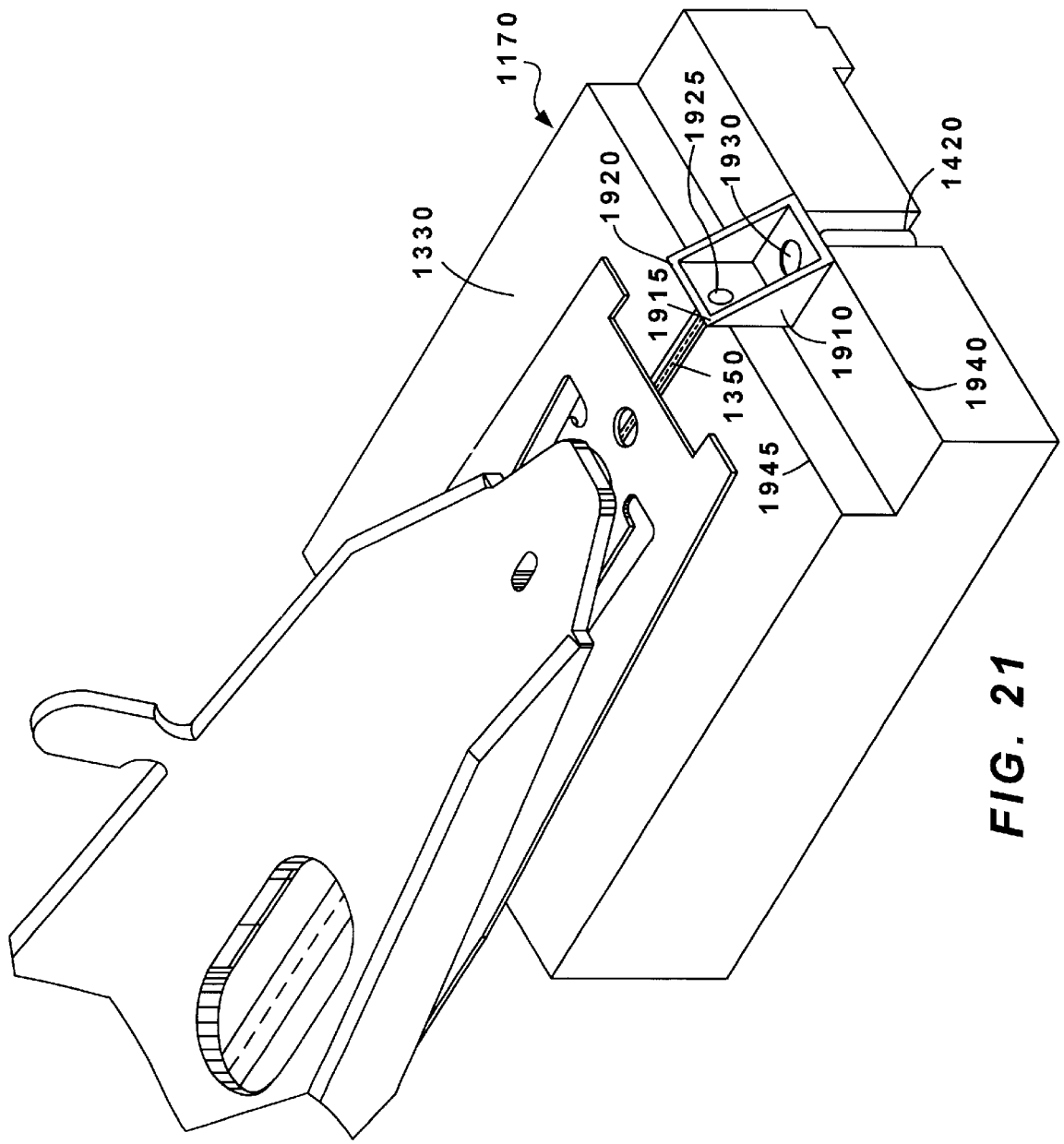
FIG. 21 is a perspective view of the magneto-optical head of FIGS. 15 and 16 shown without the mirror of FIG. 20.

Referring now to FIG. 21, it illustrates a FMO head 1170 that includes a slider body 1330 and a mirror support 1910. The mirror support 1910 includes two electrode pads 1915, 1920 that provide electrical contact points for the application of a differential voltage to the corresponding bonding pads 1815, 1820 of the mirror 1340. The mirror support 1910 additionally includes access holes 1925, 1930 that provide an unobstructed optical path from the SMPM optical fiber 1350, to the mirror reflective area 1835 (FIG. 20) and to the lens 1420.

The mirror support 1910 provides the mirror 1340 with a 45 degree support surface. Those skilled in the art will understand that the mirror support 1910 may be attached to the slider body 1330 and may be manufactured using any number of techniques. For example, the slider body 1330 can be micromachined and the mirror support 1910 can be made separately and then bonded to the slider body 1330. According to another embodiment, a 45 degree angle may be created using other techniques such as leaning the mirror 1340 against a suitably dimensioned slider 1330 having suitably dimensioned steps 1940, 1945.

Figure 22:
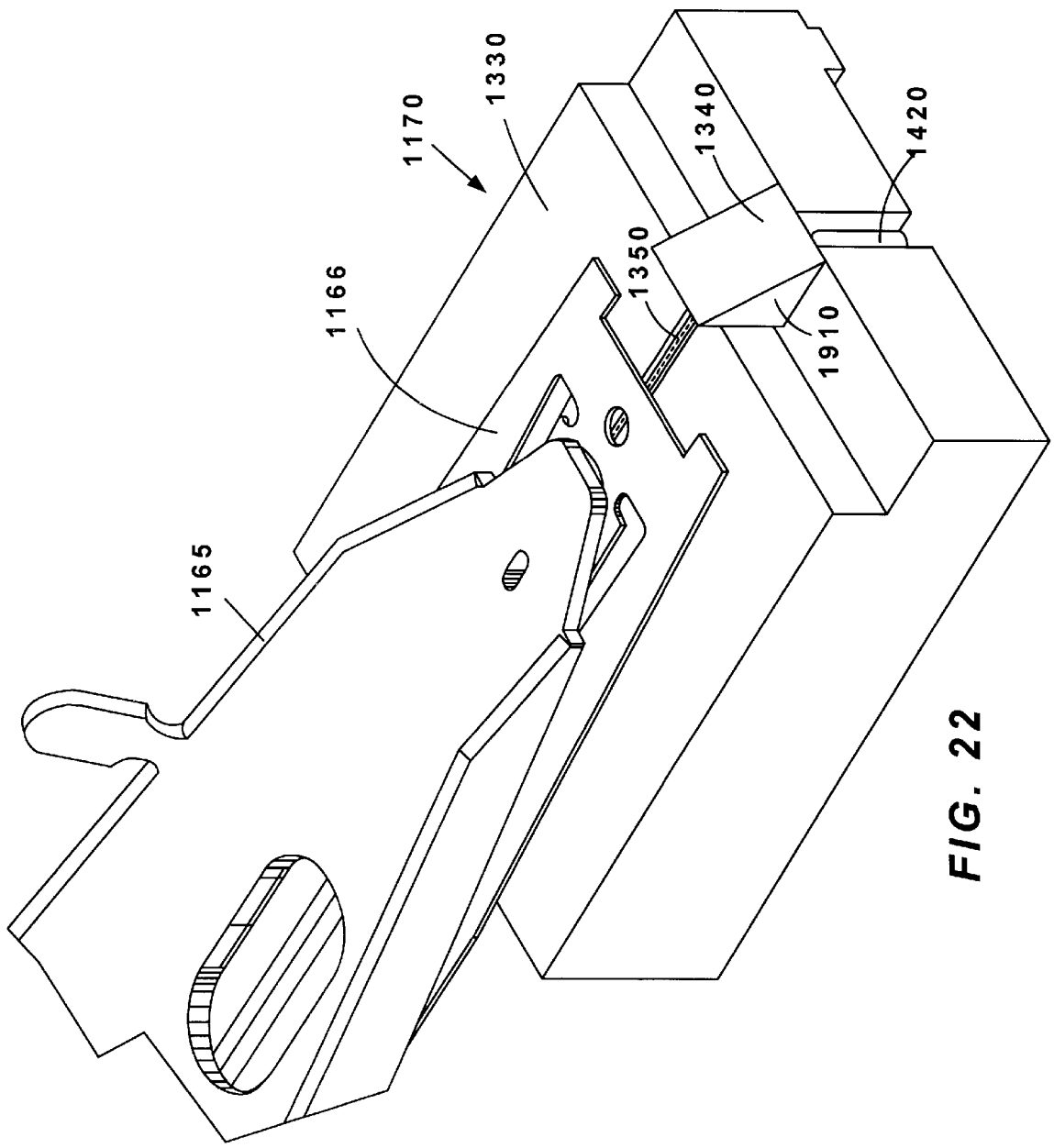
FIG. 22 is a perspective view of the magneto-optical head shown with the mirror of FIG. 20.

Referring now In FIG. 22 the mirror 1340 is shown mounted to the mirror support 1910. The application of a differential voltage to the electrode pads 1915, 1920 steers the light beam 14 supplied by SMPM optical fiber 1350. The mirror 1340 is used to change the propagation angle of the light beam 14 before transmission to the lens 1420. The movement of the resultant focal point 1440 along the radial direction 1520 (FIG. 17) of the storage medium 1180 is used for track following, as well as for short seeks from one data track to another. Track following may be accomplished by using combined coarse and fine tracking servo techniques.

A sampled sector servo format may be used to define the tracks. These servo marks may include either embossed pits stamped into the medium 1180 or magnetic marks read similar to the data marks. In the case of embossed pits, those skilled in the art will recognize that the differential amplifier 1210 (FIG. 14) output of the laser optics assembly 1110 (FIG. 14) should be substituted by an adder circuit. Coarse tracking may be maintained by continuously adjusting a current to an actuator coil (part of the actuator magnet and coil 1145 shown in FIG. 13) for controlling the position of the suspension 1165 while fine trucking may be accomplished by continuously adjusting the angular deflection of the mirror 1340. The slider 1330 is secured to the suspension 1165 by means of a flexure 1166.

The use of the steerable micro-machined mirror 1340 is advantageous because it offers a method for a very fast manipulation of an optical beam 14. This approach facilitates high-speed track following and short seeks for much improved data access times. Such improvements over conventional head technology make possible high areal densities by enabling the use of very narrow track pitches.

The FMO head 1170 design is intrinsically confocal in nature. During readout, the light beam reflected from the MO storage medium 1180 is coupled back into the SMPM optical fiber 1140 which acts as the aperture in a confocal system. One of the benefits arising from the use of confocal optics includes very high depth resolution along the optical axis as well as improved transverse resolution. Another advantage of the confocal system is that light reflected from objective optics surfaces is not collected so that anti-reflection coating may not be necessary. This is particularly advantageous in a design that uses an aplanatic lens and a non-zero working distance. The high depth resolution allows for very close spacing of the layers in a multi-layer medium with low crosstalk between layers, while the improved transverse resolution provides detection of smaller storage medium marks and sharper storage medium mark edges than would otherwise be the case in a non-confocal system.

The FMO head 1170 design illustrated herein is representative of one approach for storing information on high-density MO storage media 1180. It will be appreciated by those skilled in the art that various variations of the present invention may be implemented to achieve substantially the same goals. For example, various types of fiber optical switches (e.g. micro-mechanical, electro-optical, thermo-optical) may be utilized. In addition, the flying FMO head 1170 design my be modified for use with a free space optical input beam, thereby eliminating optical fibers 1140. Also, the focusing objective lens does not need to be limited to a GRIN lens 1420 because other micro-objective lenses, such as molded aspheres, holographic lenses, binary or other diffractive optical lenses) can also be utilized.

The present invention may also be used as a read only or a write once flying optical head, or alternatively as a flying optical head. Aspects of the present invention will be recognized by those skilled in the art as applicable to compact disks (CDs) and digital video disks (DVDs). Thus, those skilled in the art will also recognize that the present invention has aspects which are applicable to all optical storage systems.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment.

What is claimed is:

1. A slider for use in an optical or magneto-optical head that includes optical components mounted on the slider for directing a light beam onto and from a data storage medium, the slider comprising:
   a body defined by a leading edge, a trailing edge, an underside which is positioned substantially parallel to a recording surface of said data storage meduim, and an upper surface which is substantiallty parallel to said underside; and
   wherein an exposed channel pattern is formed substantially along said upper surface for positioning the optical components on said body such that said light beam propagates along a substantial portion of said upper surface parallel to said recording surface of data storage medium.

2. A slider according to claim 1, wherein said channel pattern includes a first channel that defines an optical path to the light beam.

3. A slider according to claim 2, wherein said first channel extends along substantially the entire length of said slider body.

4. A slider according to claim 2, wherein said channel pattern further includes a transverse channel that extends at an angle relative to said first channel, for ensuring that said optical path is unobstructed.

5. A slider according to claim 4, wherein said transverse channel acts as a stop for adhesive material placed within said first channel, to prevent the adhesive material from obstructing said optical path.

6. A slider according to claim 4, wherein an upright channel is formed in said trailing edge, and defines part of said optical path.

7. A slider according to claim 6, wherein said upright channel is co-planar with said first channel.

8. A slider according to claim 2, wherein an upright channel is formed in said trailing edge, and defines part of said optical path.

9. A slider according to claim 8, wherein a lateral channel is formed in said trailing edge for receiving an optical component.

10. A slider according to claim 9, further including an additional lateral channel formed in said trailing edge for receiving one or more optical components.

11. A slider according to claim 2, wherein said channel pattern includes a plurality of channels that define an optical path to the light beam.

12. A slider according to claim 11, wherein said channel pattern further includes at least one cavity for receiving an optical component along said optical path.

13. A slider according to claim 11, further including an additional lateral channel formed in said trailing edge for receiving one or more optical components; and
   wherein said channel pattern further includes a transverse channel that extends at an angle relative to said first channel, for ensuring that said optical path is unobstructed.

14. A slider according to claim 1, wherein said slider underside includes two rails that define an air bearing surface.

15. A slider according to claim 1, wherein said slider underside includes a groove formed in proximity to said slider trailing edge.

16. A slider according to claim 1, having a height ranging between approximately 864 $\mu$m and approximately 914 $\mu$m; and
   the slider having a planar footprint ranging between approximately 3,000,000 $\mu m^2$, and approximately 3,400,000 $\mu m^2$.

17. A slider according to claim 16, wherein the slider height is approximately 889 $\mu$m.

18. A flying magneto-optical head for use in a magneto-optical data storage system, comprising:
   a slider;
   an optical component mounted on the slider for directing a light beam onto and from a magneto-optical data storage medium; and
   the slider including:
      a body defined by a leading edge, a trailing edge, an underside which is positioned substantially parallel to a recording surface of said data storage medium, and an upper surface which is substantially parallel to said underside; and
      wherein an exposed channel pattern is formed substantially along the upper surface for positioning the optical component on the body such that said light beam propagates along a substantial portion of said upper surface parallel to said recording surface of said data storage medium.

19. The flying magneto-optical head according to claim 18, further including a plurality of optical components that are mounted in the channel pattern for processing the light beam.

20. The flying magneto-optical head according to claim 19, wherein the optical components include:
   first optical element for transmitting a first incident component of a linearly polarized incident light beam and for reflecting a second incident component of the incident light beam;
   a reflective surface for reflecting the first incident component of the incident light beam;
   second optical element for focusing the second incident component of the incident light beam to a spot on the magneto-optical storage medium;
   a polarization rotating element for rotating the polarization of a reflected light beam from the magneto-optical storage medium; and
   a splitter for splitting the second incident component into first and second polarization components containing the information recorded on the magneto-optical storage medium.

21. The flying magneto-optical head according to claim 19, wherein the optical elements comprise a leaky beam splitter for receiving a linearly polarized incident light beam, and for transmitting a first incident component and reflecting a second incident component of the incident light beam;
   a reflective surface for reflecting the first incident component of the incident light beam;
   an objective lens for focusing the second incident component onto a spot on the magneto-optical storage medium;
   a half-wave plate for rotating the polarization of a reflected light beam from the magneto-optical storage medium; and
   a polarization beam splitter for splitting the second incident component into first and second polarization components.

22. The flying magneto-optical head according to claim 21, further comprising optical fibers for optically coupling polarization components of the reflected light beam to a remote optics assembly.

* * * * *